United States Patent
Troutman et al.

(10) Patent No.: US 7,417,582 B2
(45) Date of Patent: Aug. 26, 2008

(54) SYSTEM AND METHOD FOR TRIGGERING AN EXPLOSIVE DEVICE

(75) Inventors: Dennis L. Troutman, Huntsville, AL (US); Herbert U. Fluhler, Madison, AL (US); Larry W. Fullerton, Owens Crossroads, AL (US); Douglas D. Fitzpatrick, Madison, AL (US); James Richards, Fayetteville, TN (US)

(73) Assignee: Time Domain Corporation, Huntsville, AL (US)

( * ) Notice: Subject to any disclaimer, the term of this patent is extended or adjusted under 35 U.S.C. 154(b) by 150 days.

(21) Appl. No.: 10/971,427

(22) Filed: Oct. 22, 2004

(65) Prior Publication Data

US 2006/0087472 A1  Apr. 27, 2006

(51) Int. Cl.
*F42C 13/00* (2006.01)
*G01S 13/00* (2006.01)

(52) U.S. Cl. .................... 342/68; 342/166; 342/118; 102/214

(58) Field of Classification Search .................... 342/68; 102/214

See application file for complete search history.

(56) References Cited

U.S. PATENT DOCUMENTS

| | | | |
|---|---|---|---|
| 4,195,295 A | 3/1980 | Kuck | |
| 4,214,240 A | 7/1980 | Weiss | |
| 4,641,317 A | 2/1987 | Fullerton | |
| 4,651,647 A | 3/1987 | Baker | |
| 4,665,332 A | 5/1987 | Meir | |
| 4,726,291 A * | 2/1988 | Lefranc | 102/214 |
| 4,813,057 A | 3/1989 | Fullerton | |
| 4,979,186 A | 12/1990 | Fullerton | |
| 5,218,164 A | 6/1993 | Magorian | |
| 5,363,108 A | 11/1994 | Fullerton | |
| 5,617,097 A | 4/1997 | Gavnoudias | |
| 5,677,927 A | 10/1997 | Fullerton et al. | |
| 5,687,169 A | 11/1997 | Fullerton | |
| 5,734,389 A | 3/1998 | Bruce et al. | |
| 5,764,696 A | 6/1998 | Barnes et al. | |
| 5,812,081 A | 9/1998 | Fullerton | |
| 5,832,035 A | 11/1998 | Fullerton | |
| 5,952,956 A | 9/1999 | Fullerton | |
| 5,969,663 A | 10/1999 | Fullerton et al. | |

(Continued)

OTHER PUBLICATIONS

Paul Bauhahn, "MEMS—Frequency Agile High Precision Ranging under the Dual; Use Applications Program (DUAP)," Honeywell Laboratories, Minneapolis, MN, Dec. 4, 2001.

(Continued)

*Primary Examiner*—Thomas H. Tarcza
*Assistant Examiner*—Matthew M Barker
(74) *Attorney, Agent, or Firm*—James Richards

(57) ABSTRACT

A proximity fuze (proximity fuse) comprising an ultra wideband (UWB) radar transmitter, a UWB radar receiver, an antenna, a timing system, and a signal processor. One embodiment includes an antenna with an annular conical radiation pattern. In another embodiment, a trigger delay is produced that is related to target detection range. In a further embodiment, multiple range shells are utilized to further discriminate target characteristics including velocity. A method is disclosed that utilizes target range, velocity, signal amplitude, and radar signal phase to identify the target and trigger the detonation. A proximity fuze system having a long storage life is disclosed comprising a proximity fuze element powered by a turbine generator and internal gas source.

3 Claims, 26 Drawing Sheets

U.S. PATENT DOCUMENTS

| | | | |
|---|---|---|---|
| 6,111,536 | A | 8/2000 | Richards et al. |
| 6,133,876 | A | 10/2000 | Fullerton et al. |
| 6,177,903 | B1 | 1/2001 | Fullerton et al. |
| 6,218,979 | B1 | 4/2001 | Barnes et al. |
| 6,239,741 | B1 | 5/2001 | Fontana et al. |
| 6,295,019 | B1 | 9/2001 | Richards et al. |
| 6,297,773 | B1 | 10/2001 | Fullerton et al. |
| 6,300,903 | B1 | 10/2001 | Richards et al. |
| 6,304,623 | B1 | 10/2001 | Richards et al. |
| 6,421,389 | B1 | 7/2002 | Jett et al. |
| 6,710,736 | B2 | 3/2004 | Fullerton et al. |
| 2001/0024170 | A1* | 9/2001 | Huff et al. .................... 342/16 |
| 2005/0179585 | A1* | 8/2005 | Walker et al. ............... 342/134 |

OTHER PUBLICATIONS

Alan H. Epstein et al. "Shirtbutton-Sized Gas Turbines:The Engineering Challenges of Micro High Speed Rotating Machinery" ISROMAC-8 Mar. 2000.

Mulloy, Rob, "Multispectral Solutions Awarded Contract from Army Research Laboratory for Development of Ultra Wideband Radar Proximity Fuze," MSSI News, Multispectral Soultions, Inc., Gaithersburg MD, Jul. 15, 1999.

Mulloy, Rob, "Multispectral Solutions Completes Development of Prototype Ultra Wideband Radar Fuze/Proximity Sensor Under Army Phase I SBIR Program," MSSI News, Multispectral Soultions, Inc., Gaithersburg MD, Dec. 21, 1998.

* cited by examiner

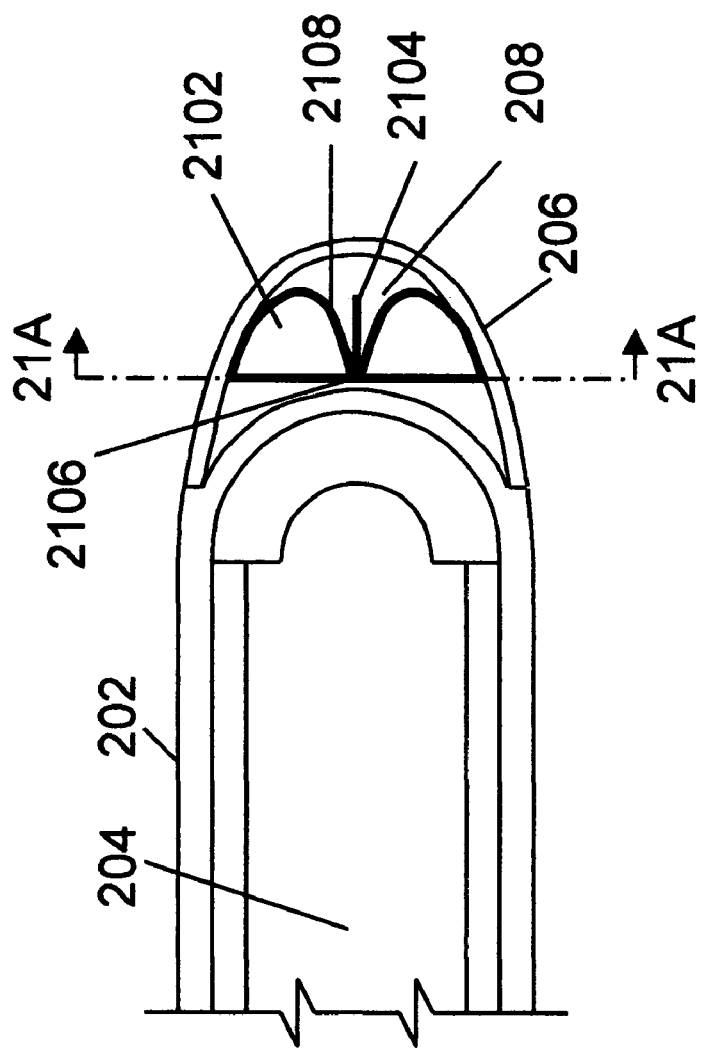
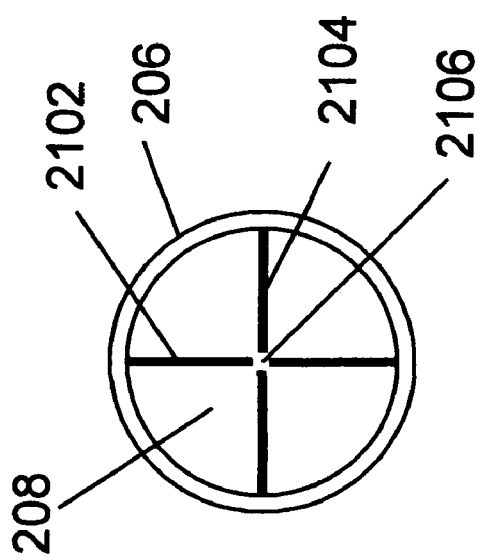
Fig. 21B
Fig. 21A

SYSTEM AND METHOD FOR TRIGGERING AN EXPLOSIVE DEVICE

BACKGROUND

1. Field of the Invention

The present invention pertains to the field of radar detection systems, more particularly to the field of radio wave based proximity fuzes including logic means. 342/68 or 102/215

2. Background of the Invention

A proximity fuze is an explosive ignition device used in bombs, artillery shells, and mines. The fuze senses when a target is close enough to be optimally damaged or destroyed by the weapon's warhead.

An example mission for a helicopter fired missile which includes a proximity fuze is to engage a small team of terrorists who possess a Short Range Air Defense (SHORAD) weapon (e.g. Red Eye, Stinger or SA-7) and intend to shoot down a commercial airliner. The missile is first aimed and then fired from the helicopter. Upon firing, the proximity fuze circuit is powered and enabled (armed). The missile may be guided or unguided during flight. Upon detecting signals indicating a proximal target, the fuze detonates the missile warhead. In such a missile, the proximity fuze may be designed in conjunction with the missile warhead to yield maximum effectiveness over a range of scenarios. In some scenarios the fuze may be required to ignore close encounters with terrain, buildings, or vegetation and yet reliably detonate proximal to the intended target.

Proximity fuzes can and have been based on acoustic, optical and radio frequency techniques. Acoustic is mostly applicable to torpedoes or mines. Optical techniques have issues with rain, smoke, and black targets and the like. Conventional radio frequency techniques include Doppler radar and radar amplitude signals. In addition, proximity fuzes have been based on conventional range gated radar. Conventional radio frequency and radar approaches are limited, however, for close range triggering in clutter environments because of difficulty achieving clutter rejection. Also, narrow band techniques are easily jammed by a small amount of RF power in band. Interference and jamming requirements must be considered in the design to avoid significant performance degradation in the field after substantial investment to deploy the weapon system.

Small missiles present an especially challenging set of systems requirements. Small missiles typically should detonate very close to the target within the lethality range of the small warhead, thus requiring close range precision fuzing. Missile flight may originate close to the ground or just above tree top and travel over or beside buildings or trees or ridges before arriving at the target area. In the target area, nearby structures or ground may need to be ignored while detecting the target and detonating at an appropriate range. Conventional RF techniques lack the resolution to achieve required performance in these complex engagements, especially in a very small package consuming a small amount of power.

Further system requirements include a long shelf life for the system including the power source. Small missiles are manufactured in large quantity and stored for twenty or more years where it is impractical to provide periodic maintenance including battery replacement.

Thus there is a need for an improved small size, long shelf life proximity fuze with short range precision fuzing capable of employing multiple target detection and discrimination methods for maximum effectiveness in complex engagements.

BRIEF DESCRIPTION OF THE INVENTION

Briefly, the present invention is a proximity fuze (proximity fuse) comprising an ultra wideband (UWB) radar transmitter, a UWB radar receiver, an antenna, a timing system, and a signal processor. One embodiment includes an antenna with an annular conical radiation pattern. In another embodiment, a trigger delay is produced that is related to target detection range. In a further embodiment, multiple range shells are utilized to further discriminate target characteristics including velocity. A method is disclosed that utilizes target range, velocity, signal amplitude, and radar signal phase to identify the target and trigger the detonation. A proximity fuze system having a long storage life is disclosed comprising a proximity fuze element powered by a turbine generator and internal gas source.

These and further benefits and features of the present invention are herein described in detail with reference to exemplary embodiments in accordance with the invention.

BRIEF DESCRIPTION OF THE DRAWINGS

The invention is described with reference to the following drawings. In the drawings, like numbers represent identical or similar components. The first digits of a reference number identify the drawing number wherein the reference first appears.

FIG. 21A and FIG. 21B illustrate one embodiment of the UWB proximity fuze employing a crossed planar slot horn antenna;

DETAILED DESCRIPTION OF THE PREFERRED EMBODIMENTS

Figure 1:
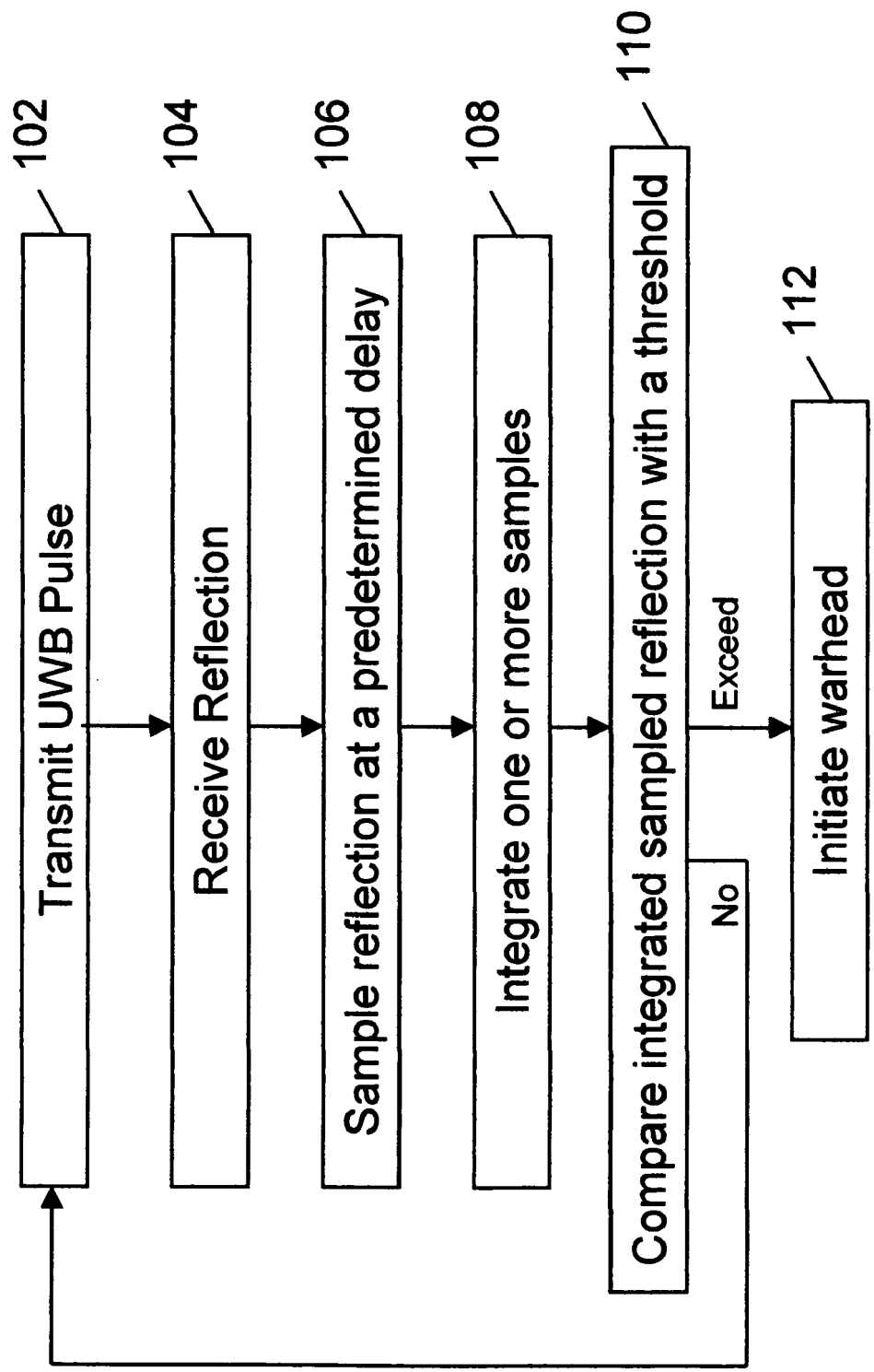
FIG. 1 is a block diagram of a method in accordance with the present invention.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art.

UWB Background

Impulse radio has been described in a first series of patents, including U.S. Pat. No. 4,641,317 (issued Feb. 3, 1987), U.S. Pat. No. 4,743,906 (issued May 10, 1988), U.S. Pat. No. 4,813,057 (issued Mar. 14, 1989), U.S. Pat. No. 4,979,186 (issued Dec. 18, 1990), and U.S. Pat. No. 5,363,108 (issued Nov. 8, 1994) to Larry W. Fullerton. A second series of impulse radio patents includes U.S. Pat. No. 5,677,927 (issued Oct. 14, 1997), U.S. Pat. No. 5,687,169 (issued Nov. 11, 1997), U.S. Pat. No. 5,764,696 (issued Jun. 9, 1998), U.S. Pat. No. 5,832,035 (issued Nov. 3, 1998), and U.S. Pat. No. 5,969,663 (issued Oct. 19, 1999) to Fullerton et al, and U.S. Pat. No. 5,812,081 (issued Sep. 22, 1998), and U.S. Pat. No. 5,952,956 (issued Sep. 14, 1999) to Fullerton. The first and second series of impulse radio patents are incorporated herein by reference.

Uses of impulse radio systems are described in U.S. Pat. No. 6,177,903 (issued Jan. 23, 2001) titled, "System and Method for Intrusion Detection using a Time Domain Radar Array", U.S. Pat. No. 6,218,979 (issued Apr. 17, 2001) titled "Wide Area Time Domain Radar Array", and U.S. Pat. No. 6,614,384 (issued Sep. 2, 2003) titled "System and Method for Detecting an Intruder Using Impulse Radio Technology", which are incorporated herein by reference.

Proximity Fuze

Modern warfare presents engagement scenarios in mixed urban and field environments that present close encounters between a projectile and objects or terrain before arriving at the target. These close encounters can trigger a proximity fuze prematurely, wasting the round and the firing opportunity and potentially leaving friendly forces vulnerable to attack. Prior art proximity fuzes, based on conventional radio, including Doppler, techniques have limited clutter rejection capability and limited range resolution capability to handle these complex engagements.

The present invention offers numerous advantages that enable complex and close range algorithms in a small, high reliability package—enabling proximity fuze capability in a 5 cm diameter projectile used in air-to-ground and ground-to-ground scenarios.

The present invention can provide triggering based on sensing a target in a narrow zone or shell (range shell) around the proximity fuze. The range shell may be on the order of 30 cm wide with a range setting from less than one meter to 30 meters or more, depending on RF power available. The range shell can positively eliminate clutter responses beyond the range shell. In accordance with the present invention, multiple range shells can be provided. Velocity can be measured within the range shell, enabling complex algorithms to handle the numerous complex scenarios required of the weapon system. In one embodiment, a delay is provided after target detection to better position the warhead for detonation. In another embodiment, multiple range shells are provided to reject false alarms. In a further embodiment, time modulation of the waveform is used to eliminate interference and jamming. A system is described using an antenna with an annular conical coverage pattern for ground proximity fuzing. A directive antenna is shown for target fuzing. In a further embodiment, the proximity fuze is powered by an internal micro-turbine source to enable high RF power in a very small projectile and achieve a 20 year, zero maintenance shelf life, unattainable with batteries.

The present invention is a system and method for a proximity fuze for ordnance. The system comprises an ultra wideband (UWB) radar transmitter, a UWB radar receiver, a logic unit, and a power source. Included is a method for initiating a warhead. The steps of the method are shown in FIG. 1. Referring to FIG. 1, a proximity fuze system transmits an ultra wideband pulse 102 from an ultra wideband radar transmitter. The UWB pulse is reflected by a target and the reflection is received by a UWB radar receiver 104. The UWB receiver then samples 106 the reflection at a predetermined delay representing a predetermined distance from the projectile. The sampling process may be limited to a single range shell or may include multiple range shells or may scan a span of range values to produce a set of data representing the response along the span of ranges. Typically, the sampled response may be integrated 108 over time to accumulate reflected signal and reject noise and interference. UWB systems may be based on pulses, chirped signals, coded signals, coded groups of pulses or other wide bandwidth signals. One or more samples may be summed or integrated to form an integrated signal 108. The integrated signal is then compared 110 with criteria indicative of target detection. When the criteria are met, the warhead is initiated 112. In one embodiment, the criteria may be a threshold comparator and when the threshold is exceeded 110, the warhead is triggered 112.

Detail Requirements for an Exemplary Proximity Fuze

To better understand the invention, requirements for an exemplary proximity fuze are presented in the following Table 1. These requirements are presented by way of example and not limitation. The invention may include parameter ranges exceeding those shown here.

TABLE 1

| PARAMETER | VALUE |
| --- | --- |
| Minimum Range | 1 meter |
| Maximum Range | 10 meters |
| Steady State Current | 100 milliamperes |
| Operating Voltage | 2.7 to 5.5 V |
| Velocity | 200 to 700 meters per second |
| Trajectory Elevation at Fuzing | 0 to 40 degrees |
| Range Accuracy | 15 cm |
| False Alarm Rate | $1 \times 10^{-3}$ |
| Field of View | 45 degrees |
| Mutual Interference | not degraded |
| Operating Time | >25 seconds |
| Probability of Kill | >0.875 |
| Mission Reliability | >0.95 @ 80% Confidence |

TABLE 1-continued

| PARAMETER | VALUE |
|---|---|
| Shelf Life | 20 years |
| Maintainability | No preventive maintenance |

The front line of the battlefield represents the environment in which the proximity fuze must operate. The atmosphere, weather conditions, clutter, countermeasures and interference define this environment. Table 2 lists the environmental parameters that must be tolerated by the system.

TABLE 2

Solar Radiation
Temperature Shock
Sand and Dust
Rain
Blowing Snow
Salt Fog
Acceleration
Temperature/Altitude
Barometric Pressure
Humidity
Falling Snow
Icing
Fungus
Vibration & Shocks The RF environment is particularly stressing with respect to clutter, interference and jamming. Clutter can be classified in two main categories: surface clutter and airborne or volume clutter. Surface clutter changes from one area to another, while volume clutter may be more predictable. Surface clutter includes trees, vegetation, ground terrain, and man-made structures (sometimes referred to as "discrete clutter"). Volume clutter normally has large extent and includes rain, birds, insects and chaff. Precipitation could include rainfall at up to 25 mm/hr. Below about 10 GHz, the atmospheric volume clutter is mostly transparent to the RF typically expected to be used in a UWB radar fuze (3 to 6 GHz), and should present little or no problem to fuze design. More substantial clutter in the form trees, vegetation, bird flocks, man-made structures and chaff presents serious challenges to conventional proximity fuzes. The present invention, however utilizes the fine range resolution, along with amplitude and velocity information available from UWB to configure more robust target discrimination than is available using conventional radar techniques.

In systems flying near the ground or triggering from ground reflections, the variability of the radar cross section (RCS) of the ground presents a significant design challenge. Again, the present invention combines the multiple information characteristics of range shell, velocity, and signal strength, as they are available in a UWB response signal to reliably detect the ground surface.

Obscurants can be a countermeasure (smoke grenades) or interference (battle field fires) and will generally be optical. However, RF (or more likely multi-band) obscurants are known to be used to blind optical, IR and RF sensors. It is anticipated that most of the RF obscurants will be band specific with an emphasis on countering Millimeter Wave (MMW) smart munitions. Therefore, the threat of obscuration is relatively small in the operating band of the UWB-based proximity fuze.

Chaff typically comprises a large number of small dipole reflectors that have large RCS values. As one form of passive ECM usually released by hostile aircraft or missiles, chaff can also be deployed from ground-based launchers. Narrow band chaff targeted to specific narrow band radar will have a small UWB cross section. Chaff designed for UWB can be significantly discriminated by utilizing the multiple sources of information from UWB signal reflections.

Electronic Counter Measures (ECM) and interference are critical factors in a battlefield environment. Enemy and friendly jammers will generally use narrow bands and specific frequencies most likely directed against communications systems and tactical surveillance radars. If ground based, they will generally point skywards at low elevation angles in all azimuths. If aircraft-based, jammers will most likely angle towards the ground to blind air surveillance and air defense radars. Jammers operating against communications systems (which generally operate below 1 GHz) will sit on the ground but often operate from hilltops and towers. Radar jammers generally operate above 2 GHz (3, 5 and 10 GHz are common tactical air defense radar bands.) and will likely deploy on jammer-specific aircraft. These jammers are often employed in a narrow band mode to direct maximum energy at the victim radar system. However, both radar jammers and communications jammers can function in a broadband jamming mode. This broad band jamming mode can usually cover all possible operating frequencies of a radar or communications transceiver. The total bandwidth of such systems is typically limited to less than 10% of the center frequency, but the total in-band power will normally exceed the target signal by orders of magnitude, thereby significantly degrading radar performance. Ultra wideband utilizes very high processing gain to overcome all forms of interference and jamming. UWB uses low power spread over an ultra wide bandwidth to minimize interference to other systems for maximum compatibility.

Physical Requirements

Figure 2:
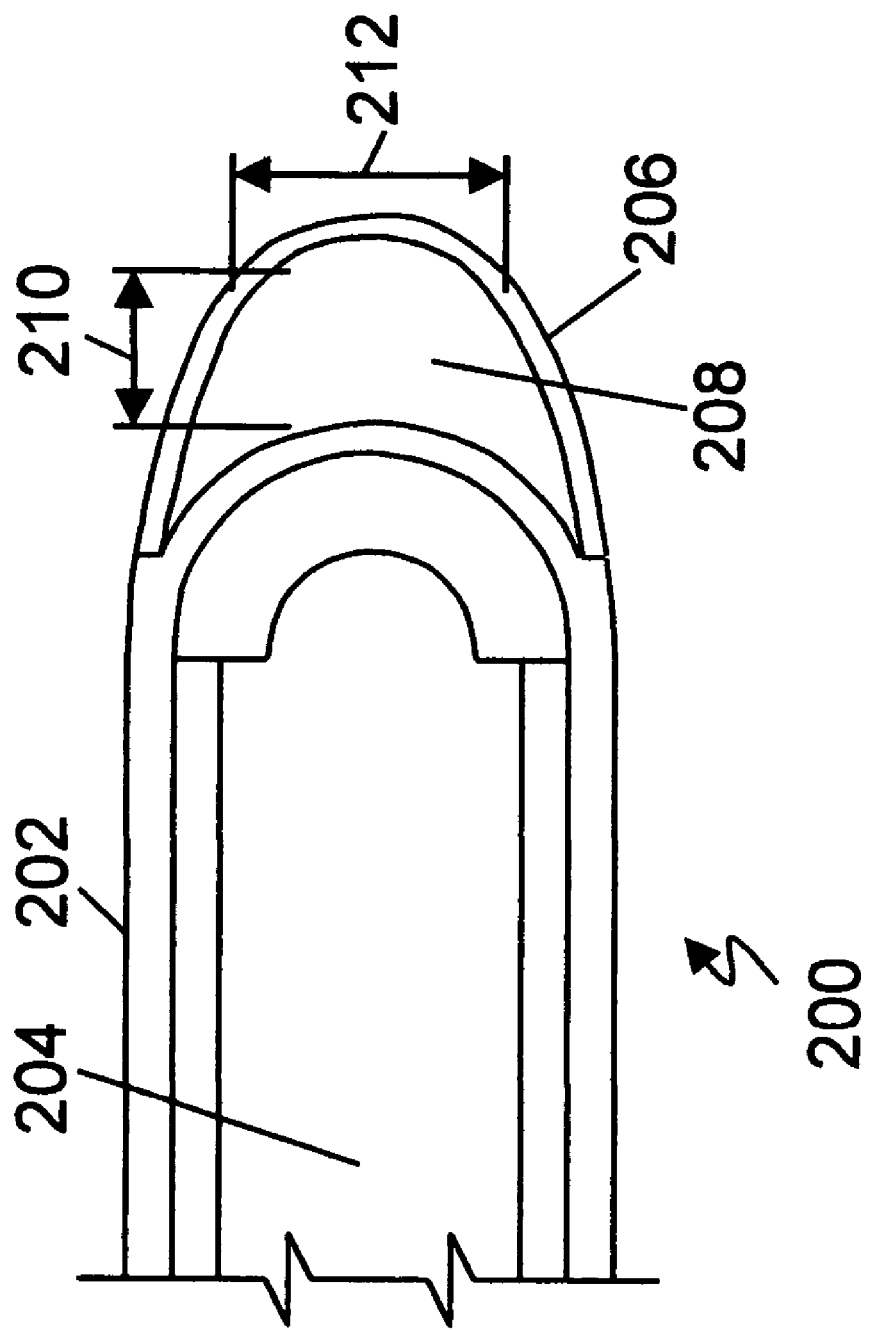
FIG. 2 illustrates an exemplary projectile section including the volume available for the proximity fuze.

A critical requirement for the proximity fuze is the need to fit within a very small enclosure. FIG. 2 illustrates an exemplary projectile section including the volume available for the proximity fuze. Referring to FIG. 2, the projectile 200 comprises an outer shell 202, an internal explosive structure 204, and a nose 206 enclosing the fuze volume 208. In one small exemplary ordnance, the volume may be roughly 5 cm in length 210 by 4.5 cm in diameter 212.

The volume constraint has two implications for the fuze. First, the need for the antenna, fuze electronics, and power source to coexist in this small volume requires a high level of integration. Second, because there is little space, the fuze circuitry needs to be miniaturized, simplified, or both. The present invention utilizes the wide bandwidth of UWB to measure distance using first order signal properties allowing simple robust circuitry that is easily miniaturized.

Engagement Geometry, Kinematics and Timeline Analysis

In this section, one embodiment of the invention is described wherein the warhead initiation is delayed after detection of the target. In this exemplary embodiment, the projectile is an air to ground missile. First, the kinematics and the engagement geometry are analyzed for the purpose of deriving UWB proximity fuze parameters such as Field Of View (FOV) and reaction time.

First, one needs to know the missile trajectory and velocity as a function of time. These can be extracted from the dynamic equations governing the behavior of the missile under the influence of two main forces, gravity and air friction.

The resistive force caused by air friction may be modeled by:

$$F_r = -kv,$$

where k is the constant of proportionality, and v is the velocity of the projectile. The model assumes that factors such as surface area and surface smoothness are constant.

Using Newton's second law, we have, $$\Sigma F = F_g + F_r = ma.$$

Here, m denotes the mass of the missile, and a stands for the acceleration.

Making substitutions for a projectile with position $$\vec{r}(t) = x(t)\vec{i} + y(t)\vec{j},$$

we get:

$$m\frac{d^2\vec{r}}{dt^2} = -mg\,\vec{j} - k\frac{d\vec{r}}{dt}.$$

We further simplify this equation by writing an equation for both the x and y components of motion. Our equations are:

$$m\frac{d^2 y}{dt^2} + k\frac{dy}{dt} = -mg \quad (1)$$

$$m\frac{d^2 x}{dt^2} + k\frac{dx}{dt} = 0$$

These two uncoupled, linear equations can be solved separately using various techniques like conjecturing and undetermined coefficients. The two general solutions are:

$$x(t) = c_1 + c_2 e^{-\frac{kt}{m}} \quad (2)$$

$$y(t) = c_3 + c_4 e^{-\frac{kt}{m}} - \frac{mgt}{k}$$

The constants $c_1$, $c_2$, $c_3$ and $c_4$ are determined from substitution of the initial conditions: $\vec{v}_0 = |v_0|\cos\theta\,\vec{i} + |v_0|\sin\theta\,\vec{j}$ and $x(0)=0$; $y(0)=H$, where $\theta$ is the angle between the initial velocity vector and the x-axis.

Thus, we finally obtain $$x(t) = \frac{v_0 \cdot m \cdot \cos(\theta)}{k} \cdot \left(1 - \exp\left(-\frac{k}{m}\cdot t\right)\right) \quad (3)$$

$$y(t) = H - \frac{m\cdot g}{k}\cdot t + \frac{m}{k}\cdot\left(\frac{m\cdot g}{k} + v_0\cdot\sin(\theta)\right)\cdot\left(1 - \exp\left(-\frac{k}{m}\cdot t\right)\right) \quad (4)$$

Choosing the parameters as follows:
m=8 kg
θ=−2 degrees
H=600 m
g=9.8 m/s2
k=0.88 kg/s, the missile flight may be calculated resulting in a simulated flight of 11.39 seconds, during which the missile velocity reduces from 700 meters/second (m/s) to 212 m/s. The horizontal distance traveled by the missile is 4,542.9 m, and the height at the end point of the trajectory is 5.16 m.

Figure 3:
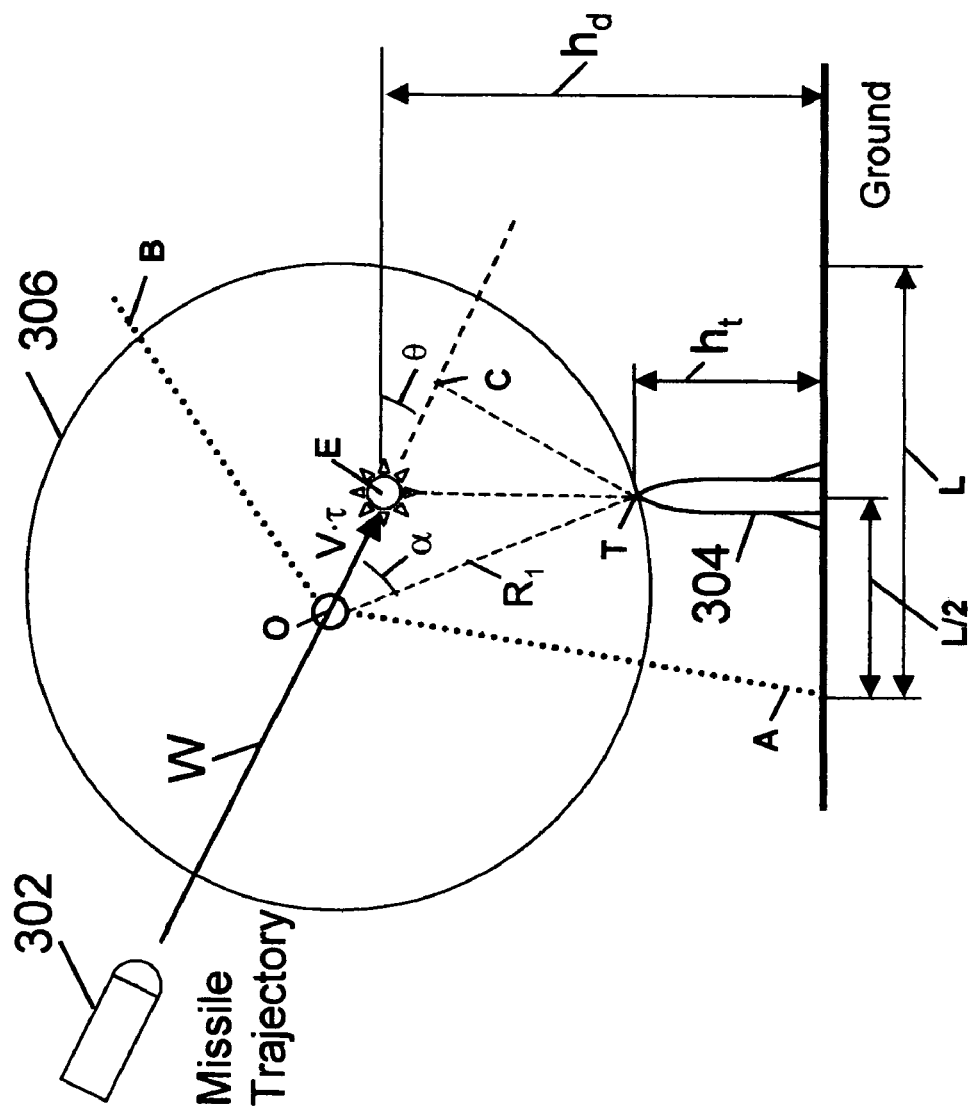
FIG. 3 illustrates an exemplary engagement of a missile with a standing target.

The engagement geometry will now be described with reference to FIG. 3. FIG. 3 illustrates an exemplary engagement of a missile with a standing target. Referring to FIG. 3, the missile is approaching the target along trajectory W. Point O on trajectory W is the point where the proximity fuze range shell contacts the target and the target is detected. $R_1$ is the range of the range shell represented by circle 306. Point E on trajectory W is the desired burst point.

Assume the target area is a circle with diameter L. The target is located exactly at the center of this circle and has height $h_t$. Also assume a time delay between the missile's explosion and the detection of the target at the smallest range, $R_1$. Let us denote such a delay as τ. Thus point E is a distance vτ from point O, where v is the velocity and τ is the delay time to be determined.

From analysis of the right triangles OTC and ETC, it follows $$R_1 \cdot \cos(\alpha) = V\tau + (h_d - h_t)\cdot\sin(|\theta|) \quad (5)$$

where V is the absolute velocity of the missile. During small time interval τ we neglect that V depends upon time. From the other hand, looking at the triangle OTE, we have the following relation $$(h_d - h_t)^2 = R^2_1 + (V\tau)^2 - 2\cdot R_1 \cdot V\tau\cos(\alpha) \quad (6)$$

Solving the equations (5) and (6) with respect to τ and α yields $$\tau = \frac{h_d - h_t}{V}\cdot\left(\sqrt{(\sin|\theta|)^2 - 1 + \left(\frac{R_1}{h_d - h_t}\right)^2} - \sin(|\theta|)\right) \quad (7)$$

$$\alpha = a\cos\left[\frac{h_d - h_t}{R_1}\cdot\sqrt{(\sin|\theta|)^2 - 1 + \left(\frac{R_1}{h_d - h_t}\right)^2}\right]. \quad (8)$$

Clearly, the inequality $R_1 > h_d - h_t$ should be satisfied. The angle α can be considered in two ways. First, α can be regarded as the lower bound for the required half beam width of the half power point of the antenna pattern for a co-boresighted forward looking antenna (i.e. one that looks out the nose of the missile). Alternatively, α can be thought of as the boresight angle (actually the cone angle) for the peak gain from a conical annular beam antenna. In fact, derivation of angle α using the eventual finalized system requirements from the final engagement scenarios (i.e. fuze on the standing target or fuze on the ground) will help determine which antenna is best for the fuze. A forward-looking "flashlight" beam is likely better for fuzing along the missile flight path to the standing targets (a "slant range" scenario). It is also likely better at rejecting false fuzing off treetops, building tops, etc. Although more susceptible to false fuzing on tree tops, roof tops, and clutter to the sides of the in-bound missile, a conical annular beam is better suited to fuzing off the ground.

The range $R_1$ for range cell 306 should be selected so that $R_1$ exceeds the desired height, $h_d$, by the amount equal to the average height of the target plus some safe margin chosen to accommodate the delay between target detection and warhead detonation.

Figure 4:
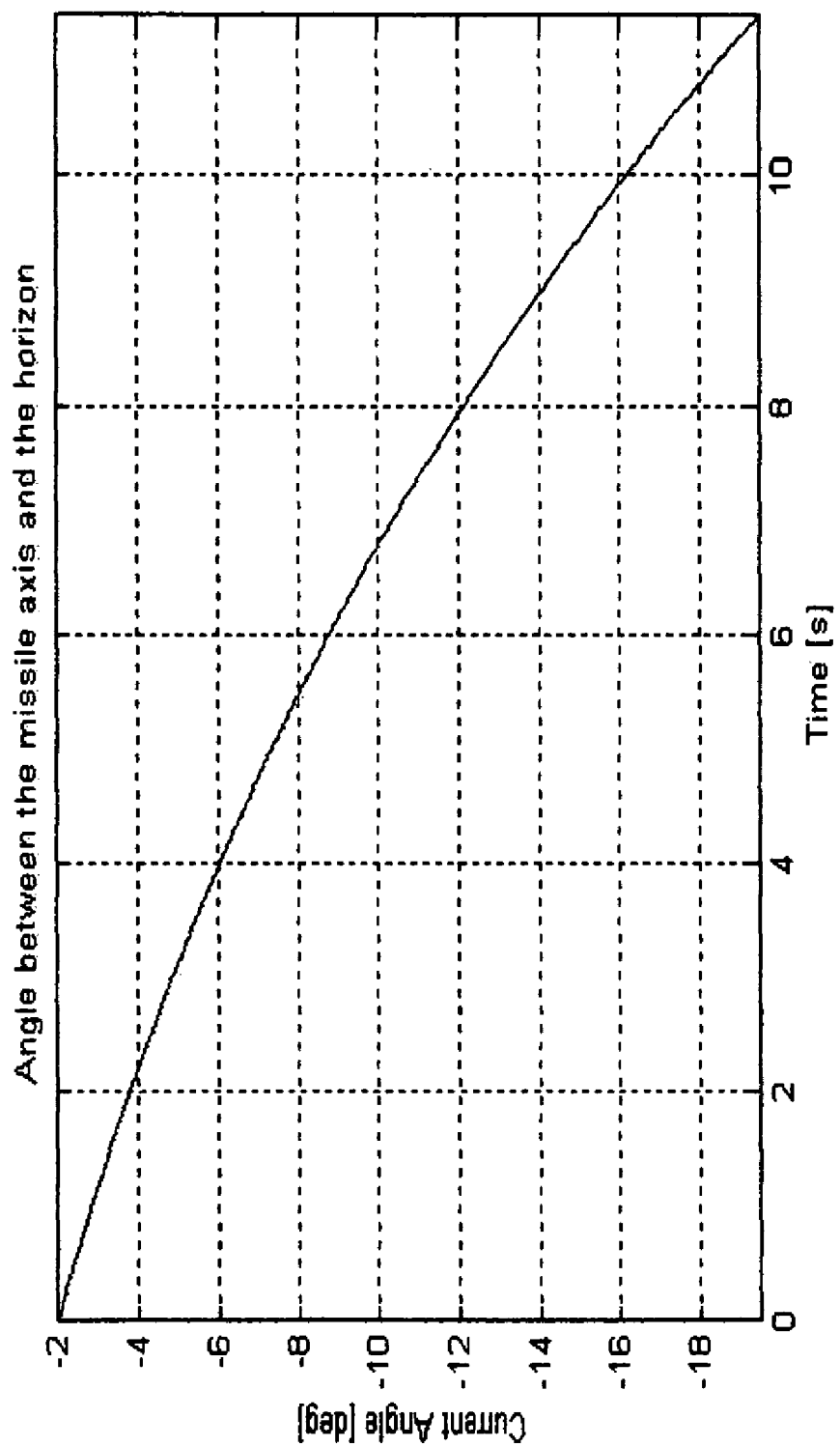
FIG. 4 shows the angle between the missile axis and the horizon.

To illustrate the formulas above, let us consider the trajectory previously calculated. The calculated angle between the missile's axis and the horizon θ is shown in FIG. 4. Close to the end of the trajectory, angle θ approaches −19.5° and V≈212 m/s. Assuming that $h_t$=1.5 m and $h_d$=2.7 m. Then we can look at different $R_1$'s and investigate how both time delay τ and angle α depend upon them. The results are shown in FIGS. 4-7.

FIG. 4 shows the angle between the missile axis and the horizon.

Figure 5:
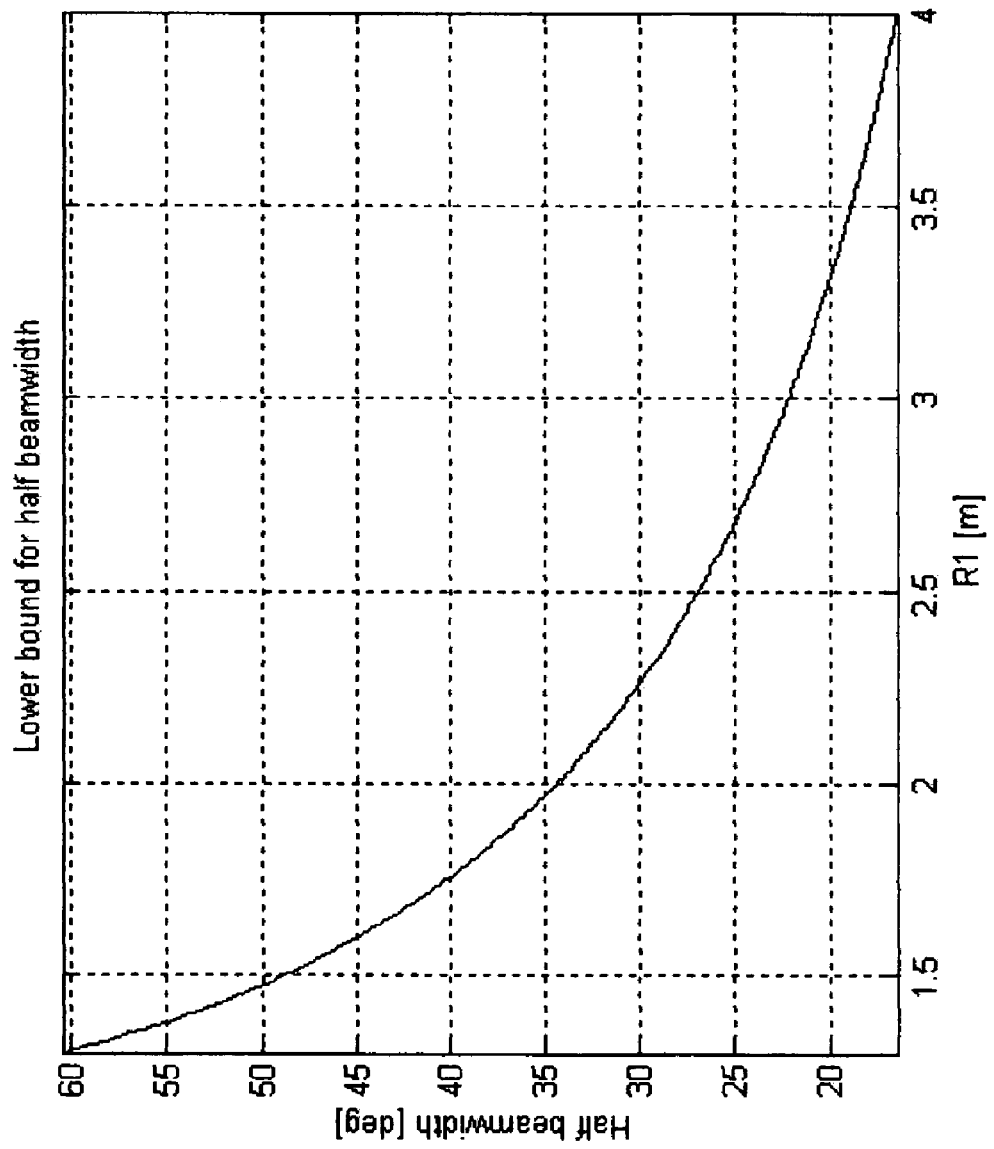
FIG. 5 shows the lower bound for the half beam width as a function of R1.

FIG. 5 shows the lower bound for the half beam width as a function of $R_1$.

Figure 6:
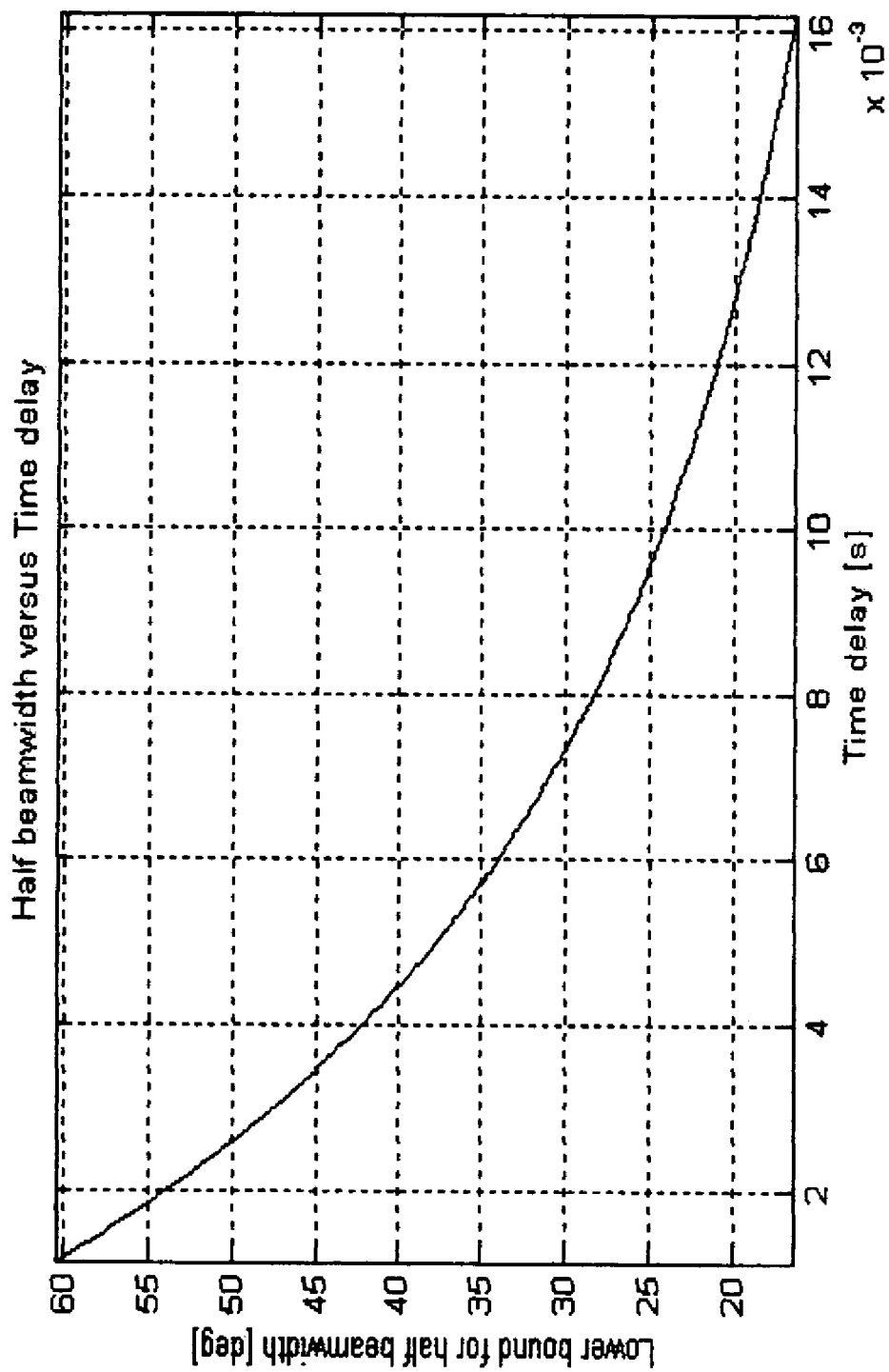
FIG. 6 shows the half beam width as a function of time delay.

FIG. 6 shows the half beam width as a function of time delay.

Figure 7:
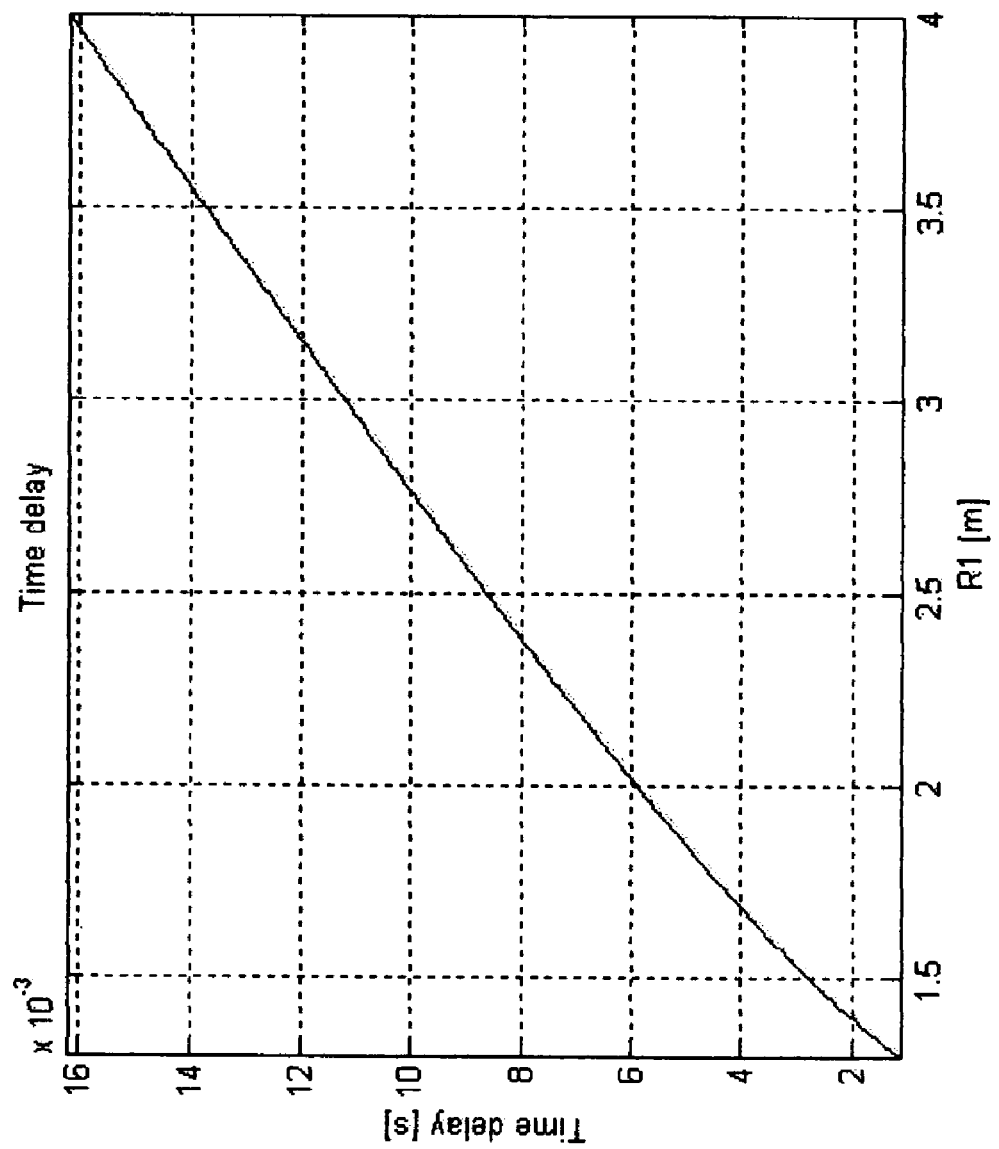
FIG. 7 shows the time delay as a function of R1.

FIG. 7 shows the time delay as a function of $R_1$.

Radar Fuze System and Operation

Figure 8:
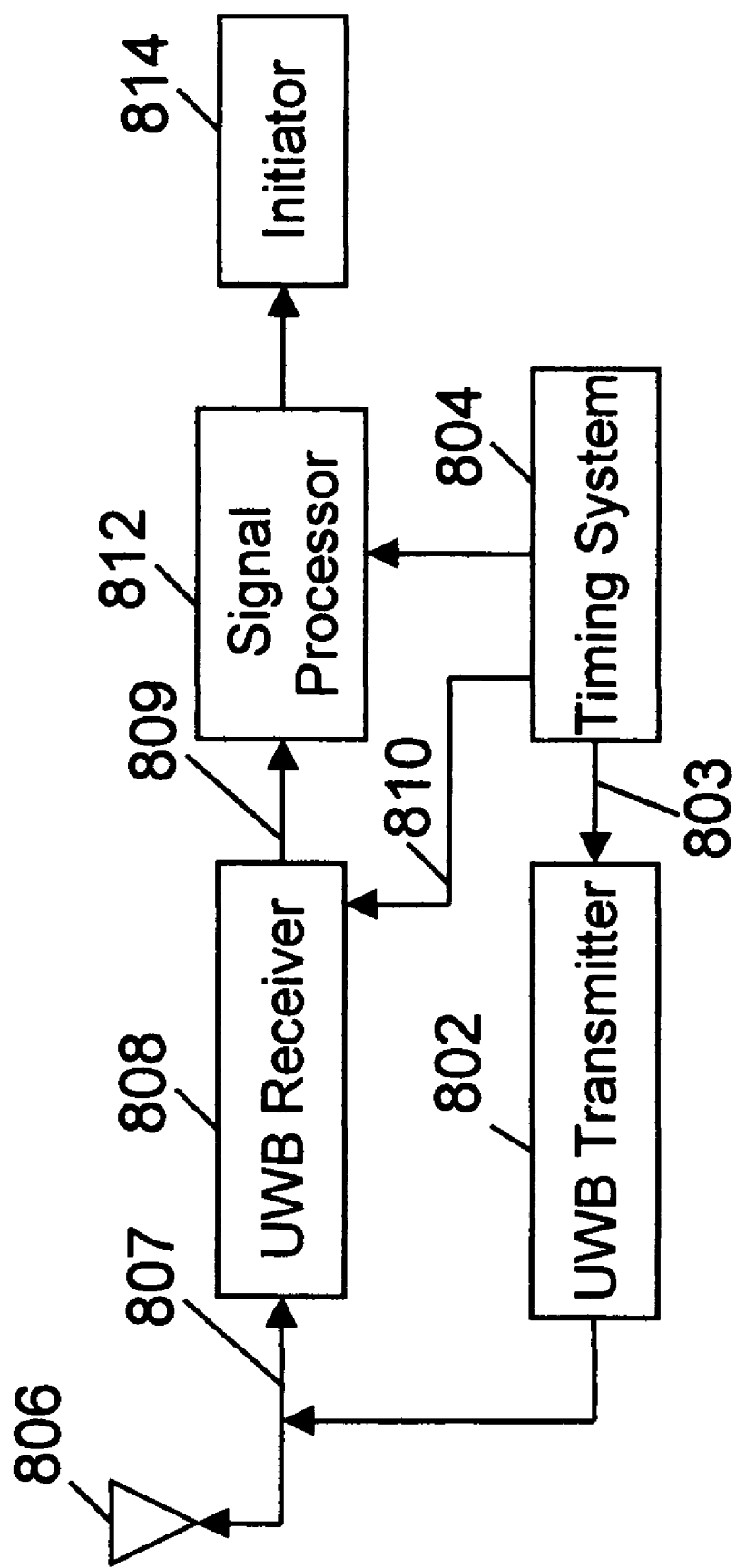
FIG. 8 shows a block diagram of a proximity fuze system in accordance with the present invention.

FIG. 8 is a block diagram of a proximity fuze system 800 in accordance with the present invention. Referring to FIG. 8, a UWB transmitter 802 transmits a UWB signal in accordance with a transmit timing signal 803 generated by timing system 804. The UWB signal is transmitted through an antenna 806 and is then reflected by a target (not shown). The reflection 807 is received by the antenna 806 and delivered to a UWB receiver 808. The UWB receiver 808 samples the reflection 807 in accordance with receive timing signals 810 generated by the timing system 804. The sampled signal 809 is passed to a signal processor 812 for further processing and target detection. Upon target detection, a signal is issued to the warhead initiator 814 to detonate the warhead.

Figure 9:
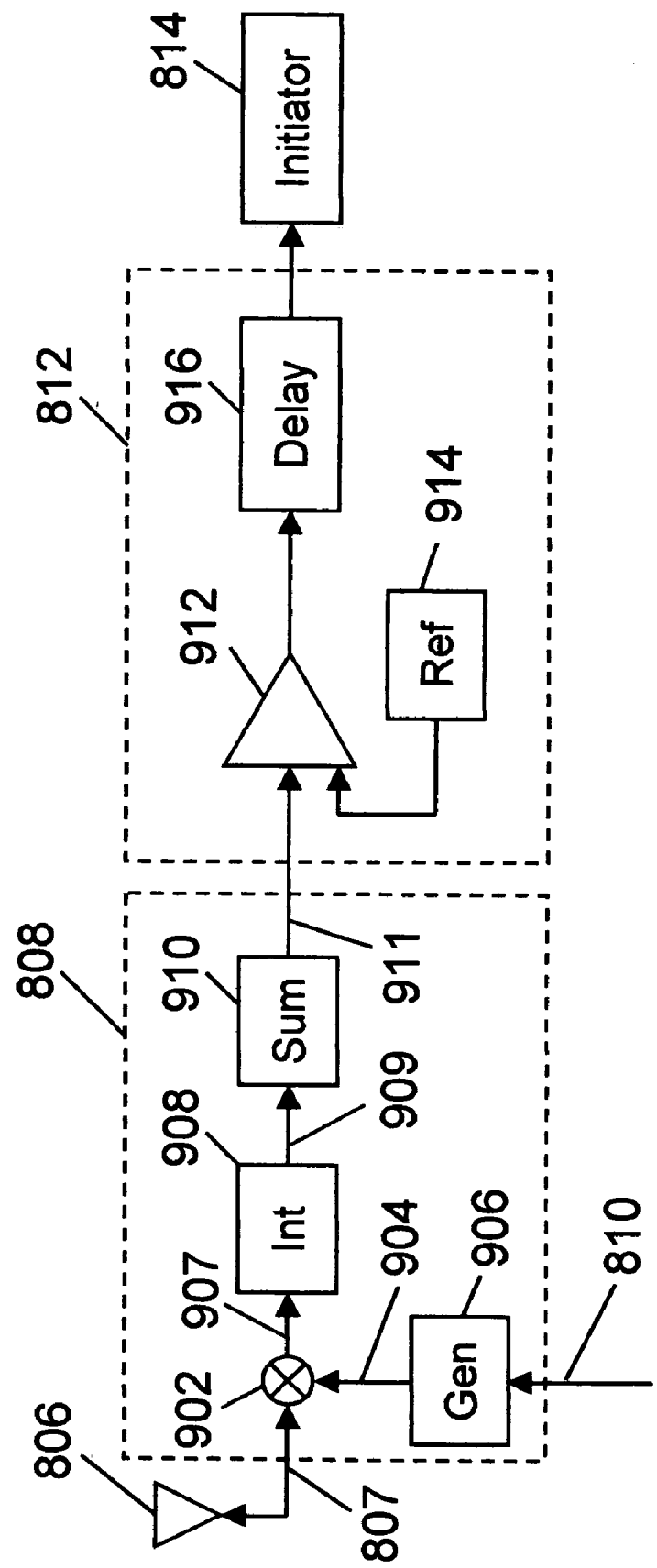
FIG. 9 shows a block diagram of one embodiment of the system of FIG. 8.

FIG. 9 is a block diagram of one embodiment of the system of FIG. 8. Referring to FIG. 9, the UWB receiver 808 and signal processor 812 of FIG. 9 are shown in greater detail. The reflection 807 is received by the antenna 806 and coupled to the UWB receiver 808. The coupling path may include a transmit/receive switch, directional couplers, filters, gain stages and such as are used on UWB radars. The UWB receiver 808 samples the reflection signal 807 in accordance with receive timing signals 810 from the timing system 804. The receive timing signals 810 may include a sampling delay representing a radio time of flight for a predetermined range. Sampling at such delay generates a response signal responsive to reflections from a target in the range shell for the predetermined range. The range shell for a coherently sampled UWB system includes the region around the sampling point and has a response shape related to the UWB pulse shape. The sampling process may comprise point sampling, correlation with a template or signal transition (edge), preprocessing with a matched filter (not shown) or a combination of techniques. In point sampling, the reflection signal 907 is multiplied in multiplier 902 by a very short ultra wideband sampling pulse 904 of wider bandwidth than the signal, where the sampling pulse 904 is produced by generator 906 in accordance with receive timing signal 810. In matched template sampling, the reflection signal 907 is multiplied in multiplier 902 by a template waveform 904 that is similar in shape and bandwidth to the signal, where the template waveform 904 is produced by generator 906 in accordance with receive timing signal 810. In signal transition (edge) sampling, the reflection signal 907 is multiplied in multiplier 902 by a rising or falling signal edge 904 as is described in co-pending U.S. patent application Ser. No. 10/173,249, filed Jun. 14, 2002, titled "Method and Apparatus for Converting RF Signals to Baseband", which is incorporated herein by reference, where the signal edge 904 is produced by generator 906 in accordance with timing signal 810. In a matched filter system, a filter of similar bandwidth to the signal (matched filter) precedes a point sampling process. In a coherent system, the phase of the signal matches the phase of the sampling system over a period of numerous samples.

In a preferred embodiment, the reflection signal 807 is coherently sampled by multiplying 902 by a sampling signal 904 resulting in a sampled signal 907. The sampling signal 904 may be a unipolar pulse or may be a matched template, signal edge, or other sampling signal. The sampled signal 907 is integrated over the sampling period by integrator 908 to produce an integrated signal 909 and integrated signals 909 may be optionally summed with other sampled signals by summer 910 to generate a summed signal 911. The summed signal 911 is passed to the signal processor 812 where the summed signal is compared with a reference 914 in a threshold comparator 912. The comparison may include absolute value processing of the signal to permit triggering on both positive and negative magnitudes. If the magnitude of the summed signal exceeds the reference 914, a target detection signal is generated and passed to a fuzing delay 916 block. After a predetermined fuzing delay 916, a trigger signal is sent to the initiator 814 that detonates the warhead.

In one embodiment, the fuzing delay 916 as described in connection with FIG. 3 is preset at manufacture. In another embodiment, the fuzing delay 916 is variable and set before firing the round. In another embodiment, the fuzing delay 916 is computed and may depend on time of flight, projectile velocity, projectile acceleration or other criteria. Thus, the engagement•geometry may be estimated from such parameters as time of flight and the fuzing delay 916 is adjusted accordingly. Computer simulations of a range of expected engagements may be used to fine tune the fuzing delay 916 and the fuzing delay 916 adjustment for best statistical performance.

Figure 10:
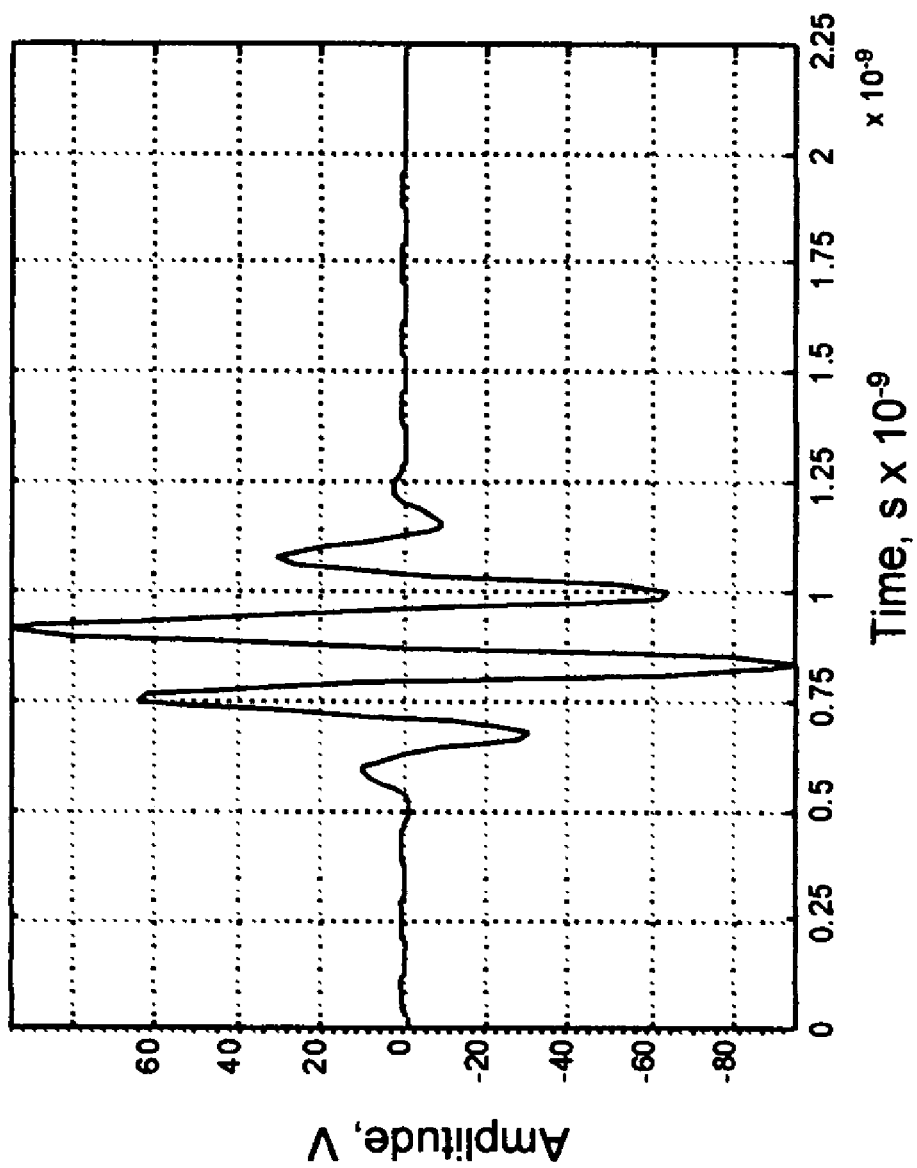
FIG. 10 illustrates an exemplary UWB pulse with a center frequency in the 4 to 6 GHz band.

FIG. 10 illustrates an exemplary UWB pulse with a center frequency in the 4 to 6 GHz band. The UWB system of FIG. 8 may use a variety of ultra wideband waveforms; however, a pulse may be preferred for some systems because of the potential for greater reduction of response outside of a given range shell. Systems, such as UWB continuous code spread systems, or other systems based on other waveforms may be subject to code sidelobe response or related mechanisms; whereas, a pulse based system depends only on the on/off signal ratio and pulse repetition rate effects. Pulse repetition rate effects may be reduced by using a low repetition rate.

The reflection of a pulse, such as the pulse of FIG. 10, off of a small object will produce a reflection waveform similar to the incident waveform. Thus, the waveform of FIG. 10 may also represent the waveform of the reflection signal. Further, when the reflection waveform is sampled over a range of time delays with a single point sampler, the output of the sampler will trace a function with a wave shape similar to the wave shape of FIG. 10. Thus, the wave shape of FIG. 10 is useful for representing several key signals in the UWB system. It should be noted that the reflection from a complex object can be thought of as multiple reflections from small portions of the object and thus will tend to produce a wave shape longer in extent than the waveform of FIG. 10. Also, a reflection processed by a match filter or sampled by a matching template may produce a response function of time difference nearly twice the length of the waveform of FIG. 10.

Thus, the narrowest range shell is produced by a system employing a point sampler with an input filter that is a wider bandwidth than the matched filter. The best signal to noise; however, results from the matched filter or matched template system.

Figure 11B:
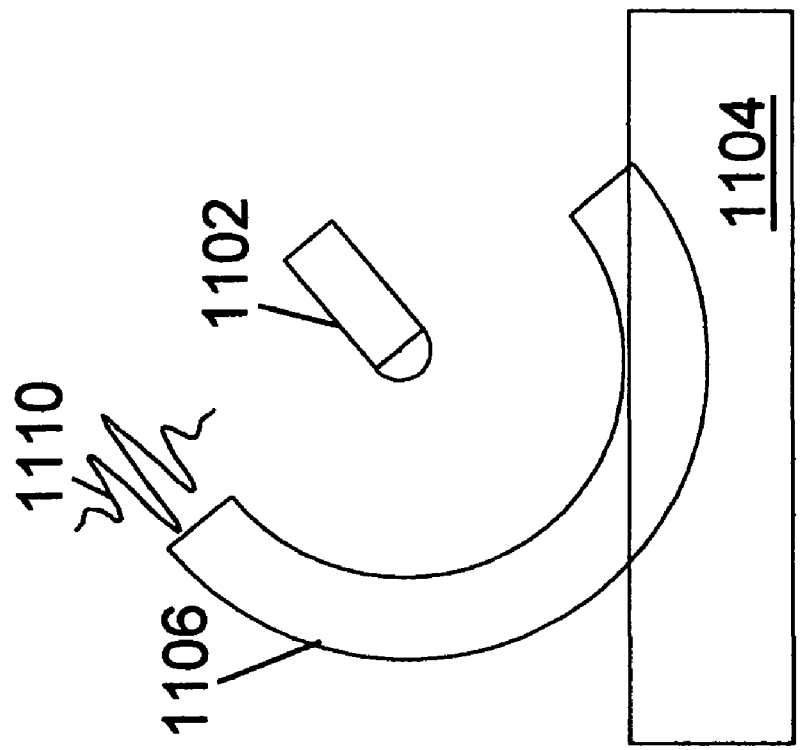
FIGS. 11A and 11B illustrate a projectile with a UWB proximity fuze having a range response shell.
Figure 11A:
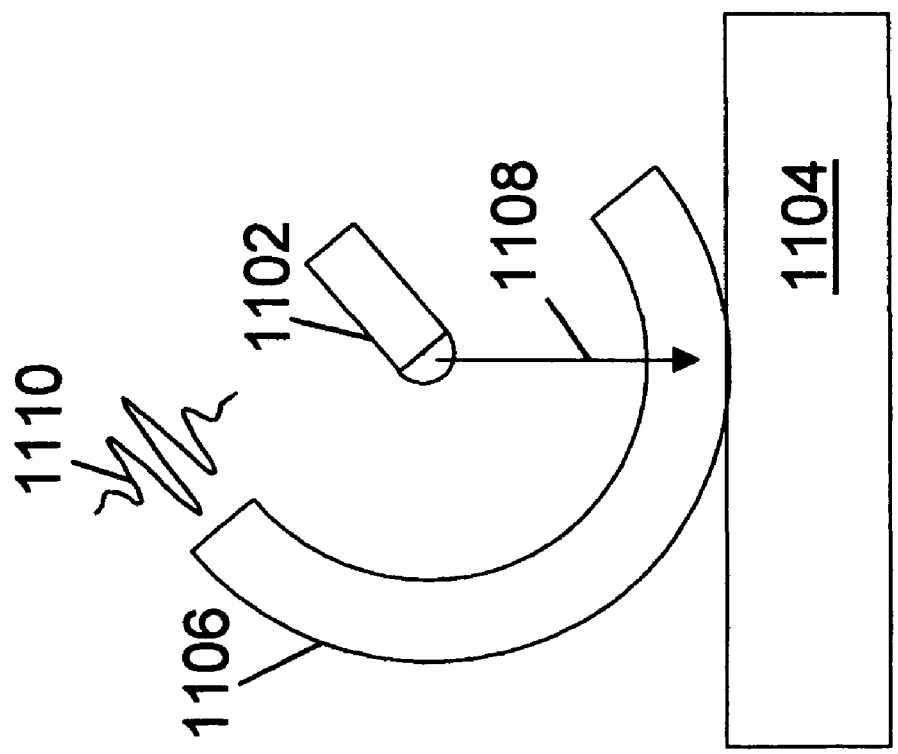

FIGS. 11A and 11B illustrate a projectile 1102 with a UWB proximity fuze having a range shell 1106. Referring to FIG. 11A, a projectile 1102 is arriving along a trajectory approaching the ground 1104. The projectile 1102 is designed to detonate a predetermined distance 1108 from the ground 1104. The UWB proximity fuze includes a receiver that samples the reflection signal a fixed delay from the transmit pulse time. This produces a response region termed a range shell 1106. The range shell 1106 has a response cross section similar in shape to the transmit waveform 1110 as shown. The range shell 1106 region indicates roughly the response extent, but the detail response is indicated by the pulse schematic 1110 shown. Thus, as the projectile 1102 approaches the ground 1104, the response received by the UWB receiver 808 traces the waveform 1110 shape over time.

The range shell thickness equals the range resolution of the radar. For a 2 GHz bandwidth, the range shell thickness is about 15 cm or half the physical length of the pulse in free space. As shown in FIG. 11A, as the shell begins to touch the ground 1104 or the target, the radar starts receiving a reflection return. As the warhead continues along its trajectory, the ground 1104 (or target) moves further into the thickness of range shell, all the while reflecting the impinging UWB pulses as shown in FIG. 11B.

During this process, the movement of the warhead affects the scanning of the UWB waveform 1110 off the ground 1104 or target. This process can be thought of as tracing across the waveform 1110 in time, and the receiver sees this tracing over the time the warhead travels the pulse length of approximately 15 cm.

For example, if the warhead approaches the ground 1104 at 200 m/s, at an angle of 20°, the rate of approaching the ground is: 200*sin(20°) m/s=68 m/s. At 68 m/s a 15 cm waveform 1110 is traced in about 0.15/68 (½)=1.1 ms. (Note the ½ factor because the radar range is halved in a given time from straight flight propagation because of transmit and return). If we use a Pulse Repetition Frequency (PRF) of, for example, 10 MHz, about 11,000 pulses participate to trace the waveform 1110. However, if all of these pulses are integrated, the result is zero because the positive and negative responses cancel. The longest integration time that produces a good response is related to tracing roughly ¼ wavelength, or 1.5 cm, or 1100 pulses, for the 5 GHz example.

Observing that the 5 GHz center frequency has a 6 cm wavelength, resulting in the radar range wavelength of 3 cm. Thus, the underlying cycles in the response waveform 1100 traced over 1.1 millisecond will have a frequency of (68 meters/second)/(0.03 meters)=2.3 kHz. Thus, the output of an integrator integrating 1100 pulses or less may be processed by a bank of filters in the neighborhood of 2.3 kHz to detect the approaching ground in the given example.

Figure 12:
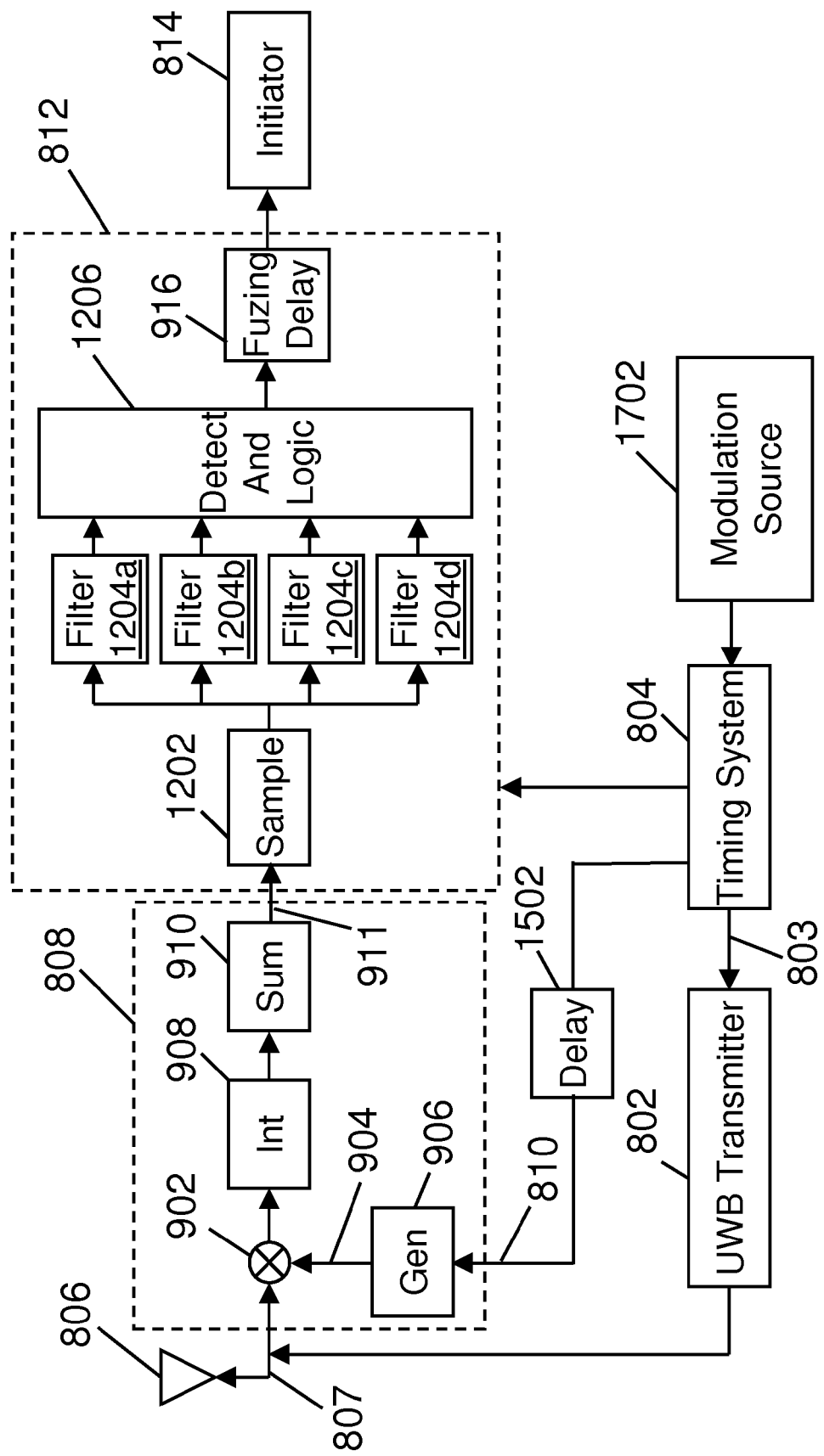
FIG. 12 is a block diagram of a system utilizing filters to further discriminate a target.

FIG. 12 is a block diagram of a system utilizing filters to further discriminate a target. Referring to FIG. 12, the UWB receiver 808 provides summed signal 911 to the signal processor 812. The signal processor 812 includes sampler 1202 that samples the summed signal 911 and provides the result to a bank of filters 1204a-1204d. The filters 1204a-1204d cover a range of frequencies expected from target detection. The frequencies depend on projectile 1102 velocity and approach angle as described above. The filter outputs are passed to detection logic block 1206 where each filter output is compared with a threshold. If one of the filter outputs exceeds its associated threshold, a target detection signal is sent to the initiator 814 to detonate the warhead.

The filter bank 1204a-1204d may also be configured to reject frequencies associated with clutter, chaff, or bullets or the like shot at the projectile 1102. For example, a target, being relatively head-on may have a relatively high frequency, whereas clutter, being to the side may have a relatively lower vector velocity in the direction of the projectile 1102, resulting in a relatively lower frequency that may be rejected by the filter bank 1204a-1204d. Also, a bullet, having an additional velocity of its own may produce a relatively high frequency, which may also be rejected by the filter bank 1204a-1204d. Bullets, also being relatively small, may also be rejected based on amplitude of response using the threshold detection feature. The use of a combination of frequency and amplitude should further prevent premature detonation due to close approach of a bullet.

Figure 13:
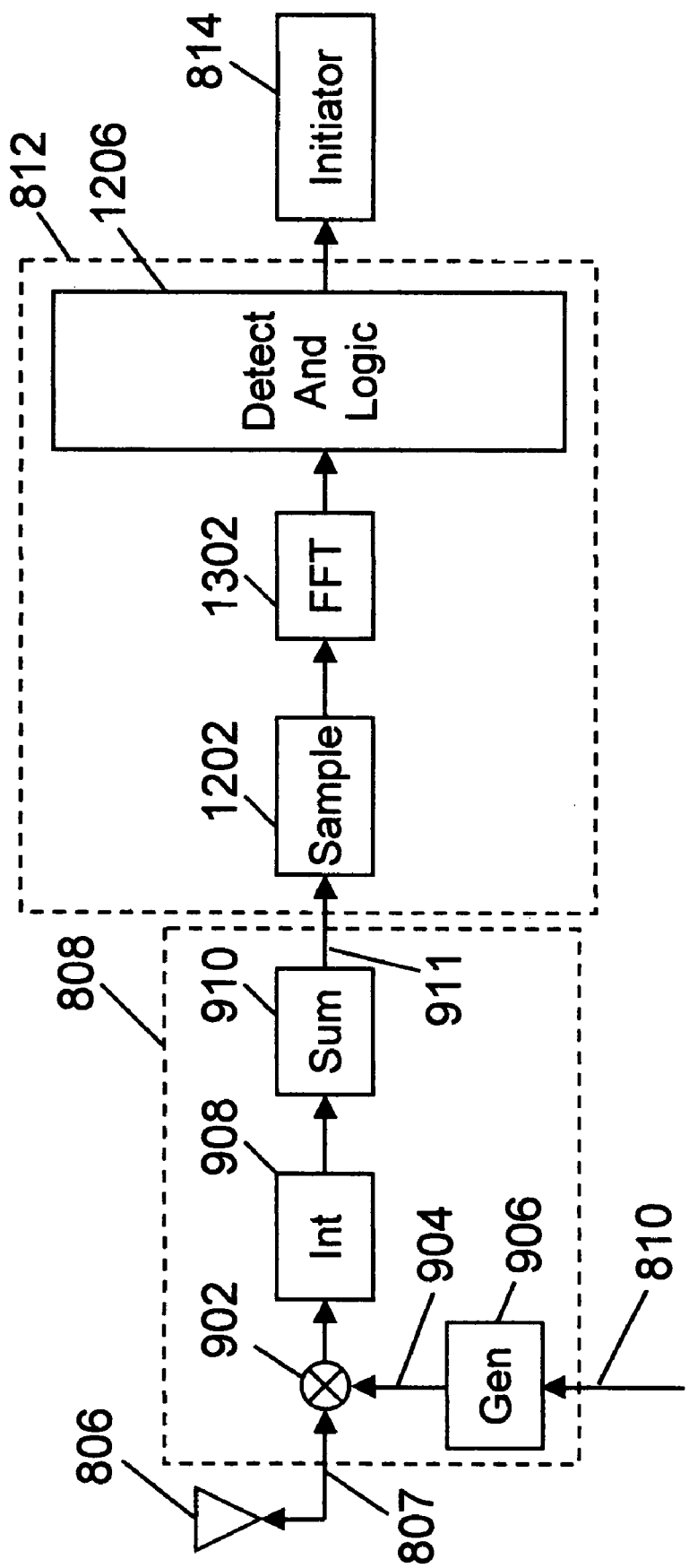
FIG. 13 is a block diagram of a system utilizing an FFT to further discriminate a target.

FIG. 13 is a block diagram of a system utilizing an FFT to further discriminate a target. Referring to FIG. 13, the UWB receiver 808 provides summed signal 911 to the signal processor 812. The signal processor 812 samples the summed signal 911 and generates a data set of samples that is provided to a Fast Fourier Transform (FFT) process 1302. The FFT process 1302 generates a set of frequency outputs that are provided to detection logic 1206. The frequency outputs are passed to detection logic 1206 where each output is compared with a threshold and if one output exceeds its associated threshold, a target detection signal is sent to the initiator 814 to detonate the warhead.

Figure 14:
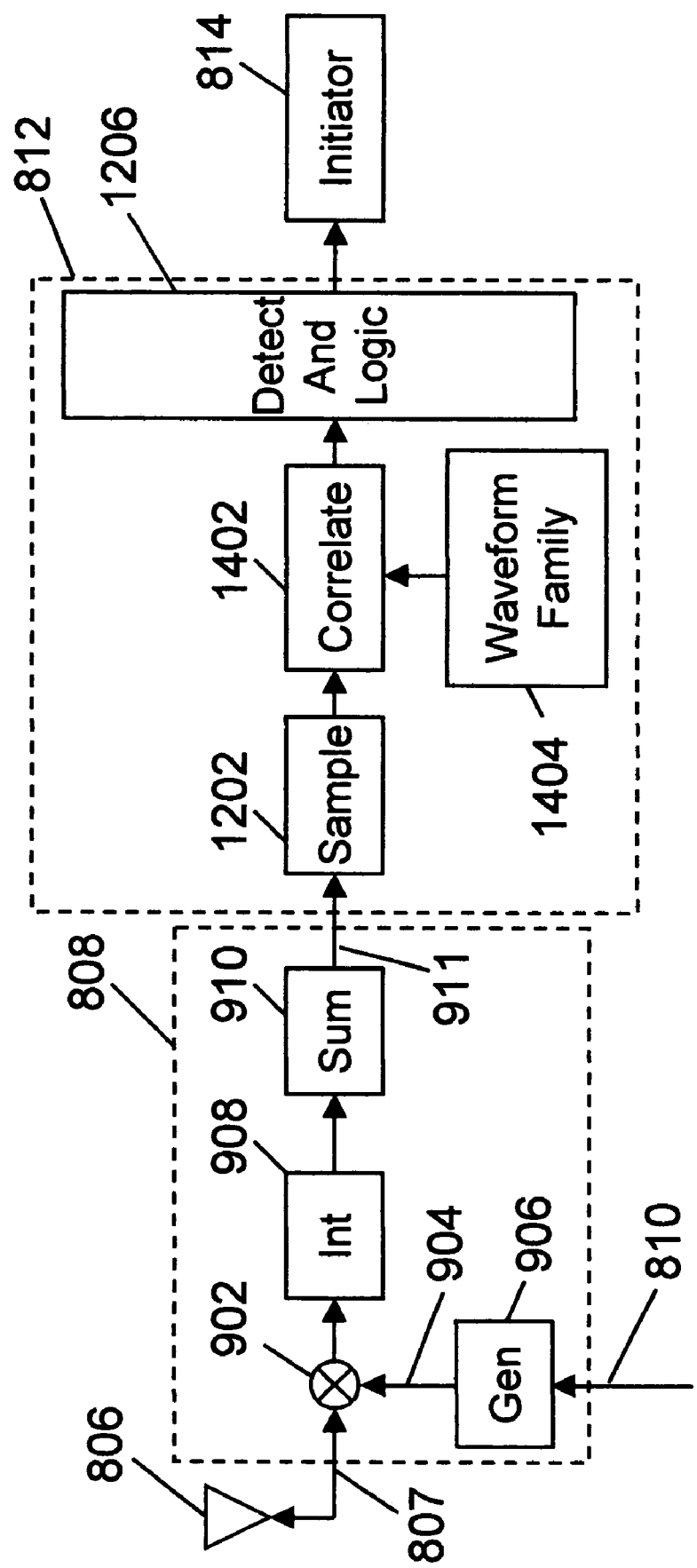
FIG. 14 is a block diagram of a system using a correlation process to further discriminate a target.

FIG. 14 is a block diagram of a system using a correlation 1402 process to further discriminate a target. Referring to FIG. 14, the UWB receiver 808 provides summed signal 911 to the signal processor 812. The signal processor 812 samples the summed signal 911 and generates a data set of samples that is provided to a correlation 1402 pattern matching process. The correlation 1402 process utilizes a family of patterns or waveforms 1404 and correlates each member of the family with the data set of samples. If a match is found, a target detection signal is sent to the initiator 814 to detonate the warhead. In one exemplary embodiment, the family of waveforms 1404 is the pulse waveform 1404 of FIG. 10 scaled along a family of time axes appropriate for the expected range of projectile 1102 velocities. For example, the central 0.5 ns of waveform 1404 data in FIG. 10 would be traced through 7.5 cm of forward movement of the projectile 1102, i.e. the sample data set would contain a sequence of samples tracing the waveform 1404 (if a target is present) through the period of time required for the projectile 1102 to travel 7.5 cm. (0.5 ns radar range is 7.5 cm). Thus, for a projectile 1102 velocity of 150 m/s the 0.5 ns waveform 1404 of FIG. 10 would span 0.5 ms and for a 600 m/s projectile 1102, the 0.5 ns waveform 1404 of FIG. 10 would span 125 μs. Thus, to match all closing velocities between 150 m/s and 600 m/s a family of waveforms 1404 (for example 12 waveforms 1404) like FIG. 10, spanning from 125 μs to 0.5 ms may be used to match the data set of samples. Each waveform 1404 from the family may be used to correlate with the data set, testing each time offset in the range of data. When one waveform 1404 matches the data, i.e. the correlation 1402 coefficient exceeds a predetermined threshold, a target detection signal is sent to the initiator 814 to detonate the warhead.

Figure 15:
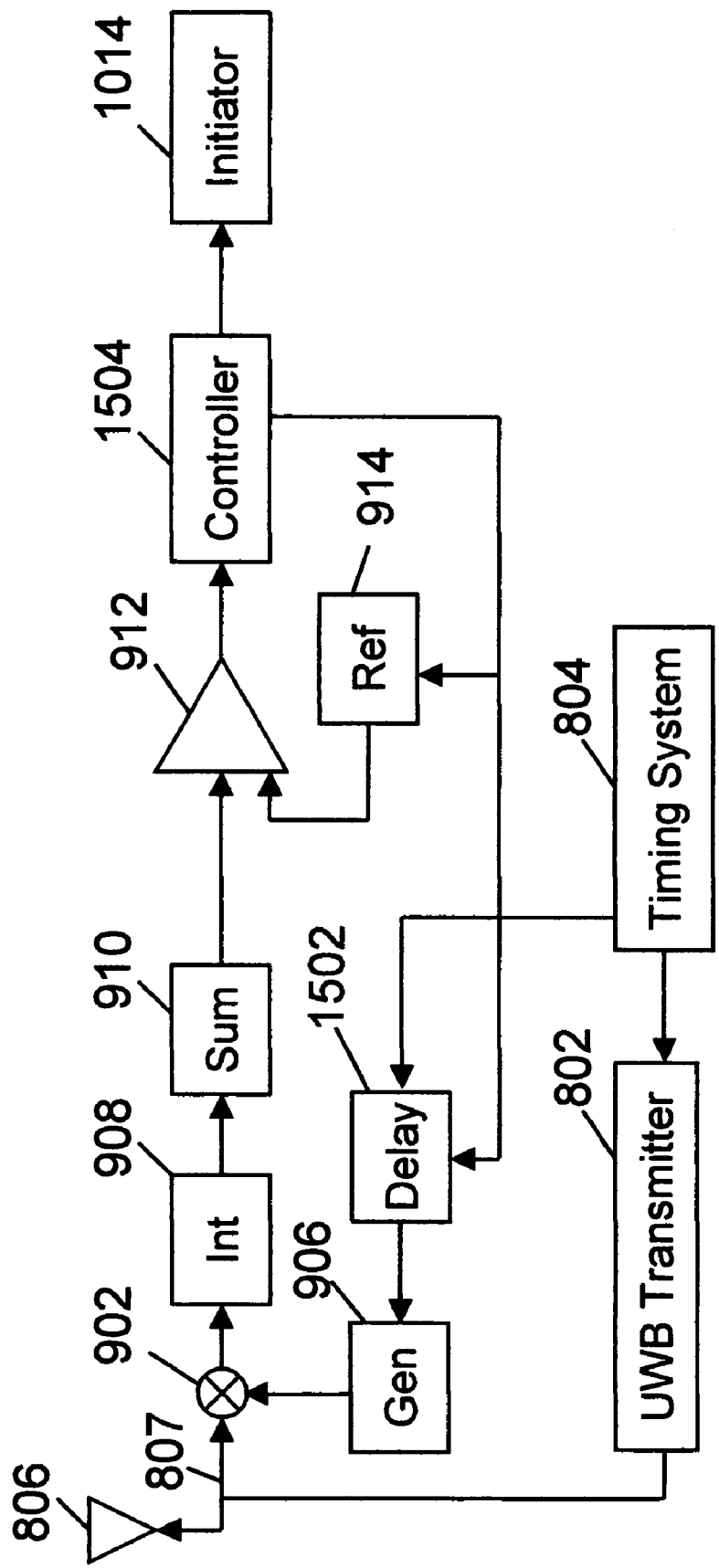
FIG. 15 is a block diagram of a system employing multiple range response shells.

FIG. 15 is a block diagram of a system employing multiple range response shells. Referring to FIG. 15, the system of FIG. 15 sequentially tests each of several range shells 1106 by setting a respective sampling delay 1502 and reference 914 level for each range shell 1106, accumulating data for each range shell and testing the result. In operation, a controller 1504 first sets the sampling delay 1502 and reference 914 level for a first range shell 1106. The UWB transmitter 802 transmits UWB signals in accordance with a timing system 804. The UWB receiver 808 receives reflected signals 807, samples or correlates to detect the reflected signals 807, integrates the sample signals, and may sum several samples to produce summed signal 911. The summed signal 911 is then compared with a reference threshold 914. If the summed signal 911 exceeds the threshold, a first target detection is signaled.

The process is then repeated for a second range shell 1106, and then additional range shells 1106 as required. In one embodiment, a detection at a first (outer) range shell 1106 enables the detection at a second (inner) range shell 1106 and so on until the final range shell 1106 triggers the warhead. In another embodiment, a processing delay is required after each range shell 1106 before enabling the next range shell 1106. The processing delay is based on the projectile 1102 velocity and prevents false trigger of all range shells 1106 in a short time due to interference.

Figure 16:
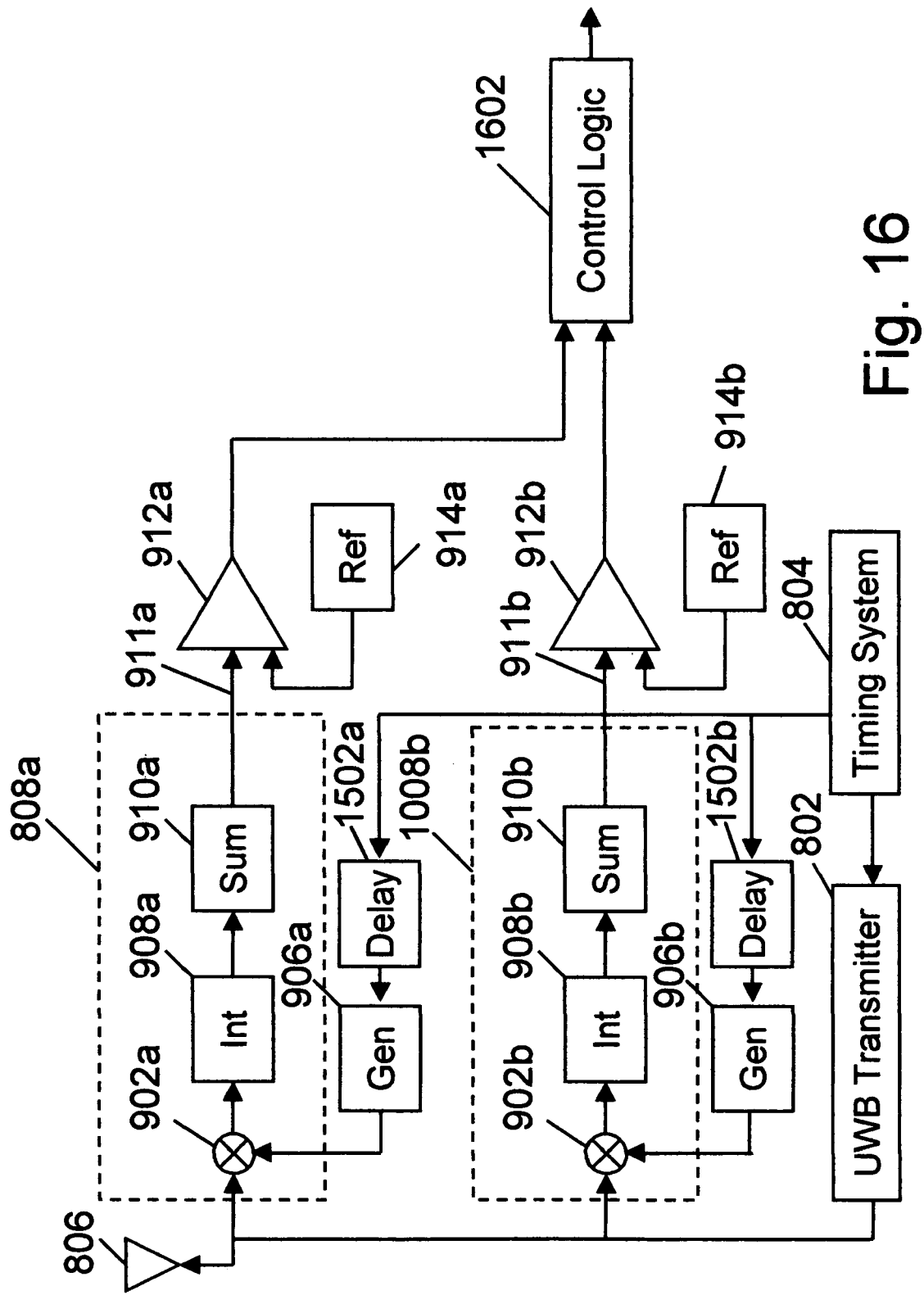
FIG. 16 is a block diagram of a system employing multiple range response shells.

FIG. 16 is a block diagram of a system employing multiple range response shells. Referring to FIG. 16, the system of FIG. 16 tests multiple range shells 1106 in parallel. Multiple UWB receivers 808a-808b operate in parallel, each sampling at a different respective delay for each respective range shell 1106. Although two are shown, any number of receivers 808a-808b may be provided. The output 911a-911b of each UWB receiver 808a-808b is compared with a respective reference 914a-914b value and the comparison is fed to a control logic block 1602. The control logic combines the information from the multiple range shells 1106 to produce a warhead trigger signal. In one embodiment the control logic block 1602 may require each range shell 1106 to be triggered in sequence as in the system of FIG. 15.

In one embodiment of the present invention, three different range shells R1, R2, and R3 (R1<R2<R3) are pre-selected and fixed before the launch. (For example R1, R2 and R3 may correspond to range shells of size 3.5 m, 4.25 m and 5 m.) The radar will collect integrated samples only at these three range shells. The smallest range shell R1 should be selected such that it exceeds the desired height, $h_d$, by the amount equal to the average height of the target plus some safe margin chosen to accommodate the delay between target detection and missile detonation. The signals collected at the larger range shells R2 and R3 will serve the purpose of reducing false alarm rate.

Noise Modulation

Figure 17A:
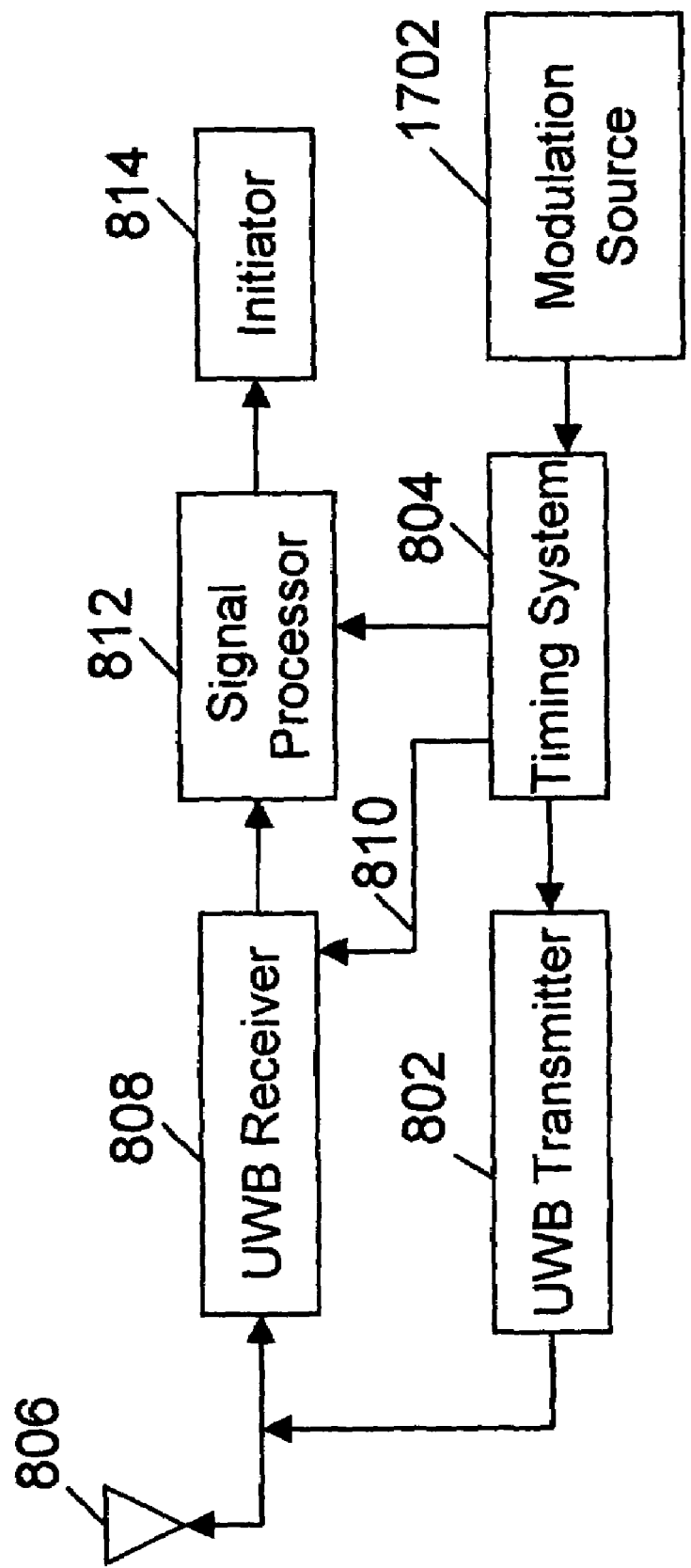
FIG. 17A is a block diagram of a system utilizing modulation to avoid interference and jamming.

FIG. 17A is a block diagram of a system utilizing modulation to avoid interference and jamming. Referring to FIG. 17A, a modulation source 1702 is provided to the timing system 804 to modulate the transmitter 802 and receiver 808 timing signals 810 to prevent long term synchronization with similar systems and the resulting interference, and also to prevent jamming by a synchronous jammer or repeater. The modulation source 1702 may be a noise source such as a noise diode or the like, or pseudo noise source such as a PN sequence generator or pseudo random number generator or other long numeric algorithm. The timing system 804 then modulates the transmitter 802 by modulating the pulse time or pulse repetition frequency or pulse polarity in accordance with the modulation source 1702 signal. The timing system 804 also modulates the receiver template with a similar modulation to synchronize the receiver 808 with the transmitted pulse. In one embodiment, both the transmitter 802 and receiver 808 may be modulated identically if the modulation changes negligibly in the round trip time for a pulse at the range shell interval, for example 14 ns for the 2 meter range shell.

Figure 17B:
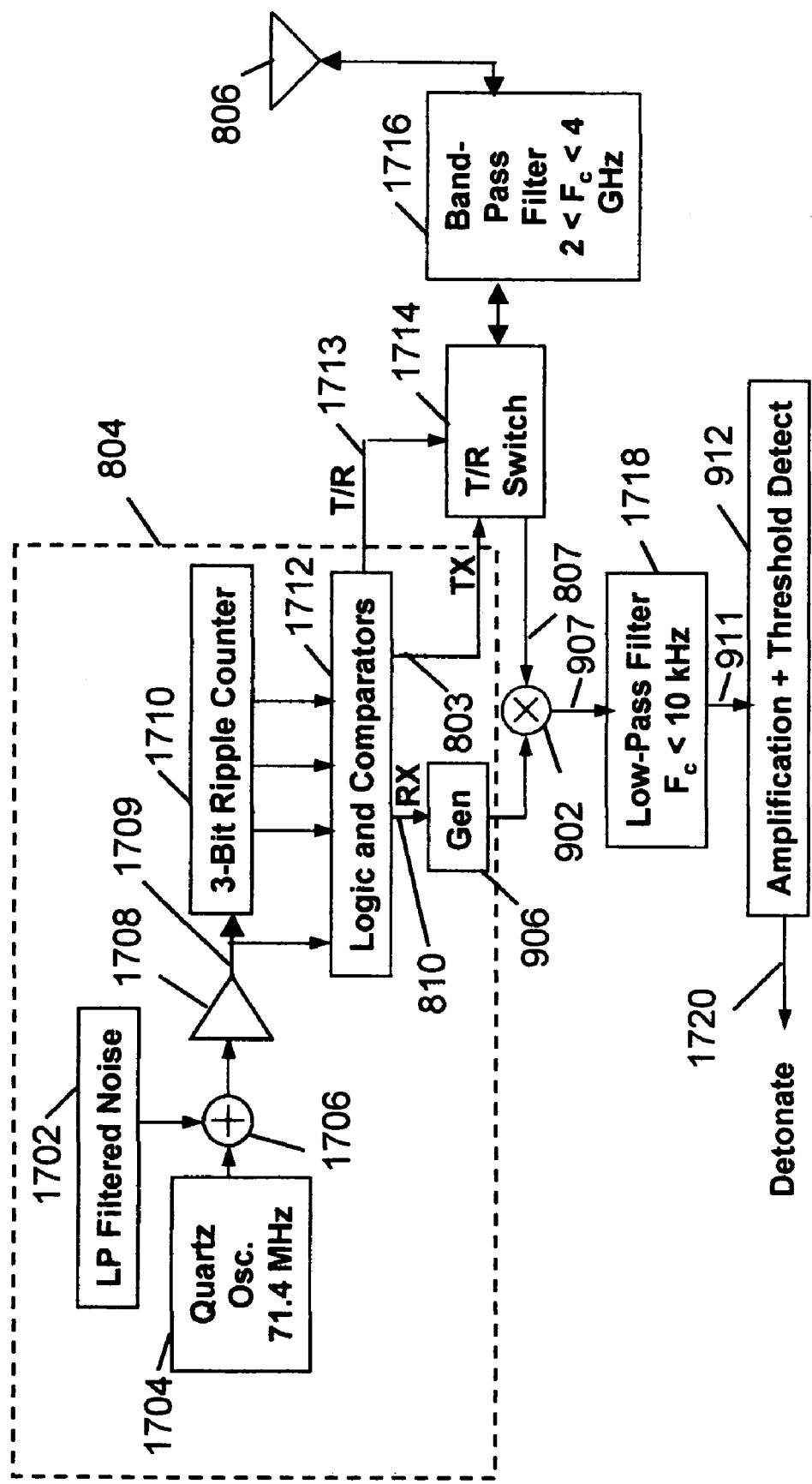
FIG. 17B is a block diagram of a system employing an efficient architecture and utilizing noise modulation to reduce interference.

FIG. 17B is a block diagram of a system employing an efficient architecture and utilizing noise modulation to reduce interference. The system of FIG. 17 includes a timing system 804 which utilizes a 3 bit ripple counter 1710 to supply the timing signals 810 required for the UWB transmitter 802 and UWB receiver 808. Keeping the components to a minimum reduces size and power consumption. The system of FIG. 17 also utilizes time modulation of the clock signal 1709 to dither the pulse position to reduce interference with and from similar systems in concurrent use in the area.

Referring to FIG. 17B, a quartz oscillator 1704 is utilized as a timing source. The quartz oscillator 1704 output is designed to have a slope on transition, such as a sine wave or trapezoid waveform 1404 as opposed to a fast edge square wave. A noise source is provided and filtered to limit the slope (dv/dt) of the output. The filtered noise 1702 source output and oscillator output are summed and the result is processed by a high speed comparator 1708. Thus, the output of the high speed comparator 1708 is a fast edge square wave with the timing of the edge determined primarily by the quartz oscillator 1704, but with a time dither of a portion of a clock cycle determined by the noise source. The slope of the filtered noise 1702 should not be so high as to disrupt reception of pulses from the range shell 1106. For example, a system designed to have a two meter range shell 1106 will sample the reflection 14 ns after the transmitted pulse. Thus, the time dither slew rate of the clock signal 1709 should not change position of the receive sample relative to the transmitted pulse by more than ¼ wave, preferably no more than ¹⁄₁₀ wave at the center frequency of the UWB signal. For a 3 GHz UWB center frequency, ¹⁄₁₀ wave would be 33 picoseconds. The total peak to peak excursion of the dither (accumulated over many clock cycles), however, can easily be ¼ of the 14 ns period of the 71 MHz clock, or 3.5 ns, which is sufficient to significantly decorrelate the summation process (low pass filter 1718) of multiple samples from a similar system operating nearby.

Referring again to FIG. 17B, the output of the comparator 1708 drives a 3 bit ripple counter 1710 and a logic unit 1712. The logic unit 1712 combines the comparator output and counter output to generate timing signals 810 comprising a transmit (TX) signal 803, a receive (RX) signal 810 and a transmit/receive (T/R) switch signal 17. The transmit signal 803 is used to generate a transmit pulse that is passed through the T/R switch 1714, a band pass filter 1716 and then transmitted via the antenna 806. A reflection signal 807 is received by the antenna 806 and coupled through the T/R switch 1714 to a sampler 902 (or correlator 902), which samples the reflection signal 807. The sampled signal 907 is filtered by a low pass filter 1718, which has the effect of summing the samples from multiple pulses, and the filtered result 911 is amplified and compared with a reference threshold 914 in comparator 912. When the threshold is exceeded, a signal 1720 is sent to detonate the warhead.

Foldover Range Intervals

In a pulsed UWB system, the pulse to pulse time, also called inter pulse period (IPP), can generate multiple range shells 1106 resulting from the reception of the response from multiple pulses at a given sample time. This can result in ambiguous and extraneous range shell 1106 responses inside or outside the desired range shell 1106.

For example, if the fuzing range is two meters, then a Pulse Repetition Frequency (PRF) should preferably be chosen that has an Inter-Pulse Period (IPP) significantly larger than the round trip time across two meters (i.e. about 13 nanoseconds). If the IPP is less than the round trip time for the desired range shell 1106, additional range shells 1106 will be generated at shorter ranges, internal to the desired range shell 1106. If the IPP is only slightly greater than the round trip time for the desired range shell 1106, then additional range shells 1106 will be generated slightly beyond the desired range shell 1106. Range response shells beyond the first range shell are termed aliased range shells in this disclosure because they appear to be at the distance of the first range shell.

In one exemplary embodiment, the PRF may be chosen so that the aliased range shells are far enough away to be reduced in response sufficiently to be ignored. For example, a UWB impulse radar with a PRF of 10 MPPS (mega-pulses-per-second) has a pulse-to-pulse time of 100 ns, resulting in the round trip range of about 15 meters. Thus, the unambiguous range interval extends to about 14 meters. If the fuzing range shell is at 2 meters, the folded over range cell is at 15+2=17 meters, or 8 times farther away. For example, in a system designed to fuze on a ground 1104 return at 2 meters, when the projectile 1102 achieves 17 meters altitude, there will be a response from the ground 1104 in the ambiguous range interval, but that signal will be about 18 to 36 dB down from the ground 1104 return at the fuzing height 1108 of 2 meters. In a typical system, this difference is large enough that the aliased return may be tolerated because it will not exceed the amplitude threshold.

Alternatively, the response from aliased range shells 1106 may be reduced by using a coded pulse train. The code may time or amplitude modulate the pulse train to reduce aliased range shells 1106. If the code repeats after a number of pulses, the aliased range shells 1106 occur as a function of the code repeat time. Also, typical codes have a side lobe response that prevents perfect cancellation of the aliased range shells 1106. A good code to be used for reduction of aliased range shells 1106 includes codes with good autocorrelation properties, i.e. low autocorrelation sidelobes for shifted copies of the code. Good codes include, for example, Barker codes, maximal length PN sequences, Kasami codes, Gold codes and time modulation codes based upon Golomb ruler techniques and other similar codes, some of which are described in U.S. patent application Ser. No. 09/811,326, filed Mar. 16, 2001, titled "High Pulse-Rate Radio-Frequency Appratus and Associated Methods" and U.S. patent application Ser. No. 10/616,118, filed Jul. 9, 2003, titled "Method for Generating Communication Signal Sequences Having Desirable Correlation Properties and System for Using Same", which are both incorporated herein by reference.

Alternatively, a system utilizing multiple range shells can be constructed by intentionally designing the fuze to respond to aliased range shells 1106. One such system may be constructed as in FIG. 9 with a single comparator. Such a system does not distinguish responses among the aliased range shells or use different thresholds for the different range shells 1106.

Figure 18:
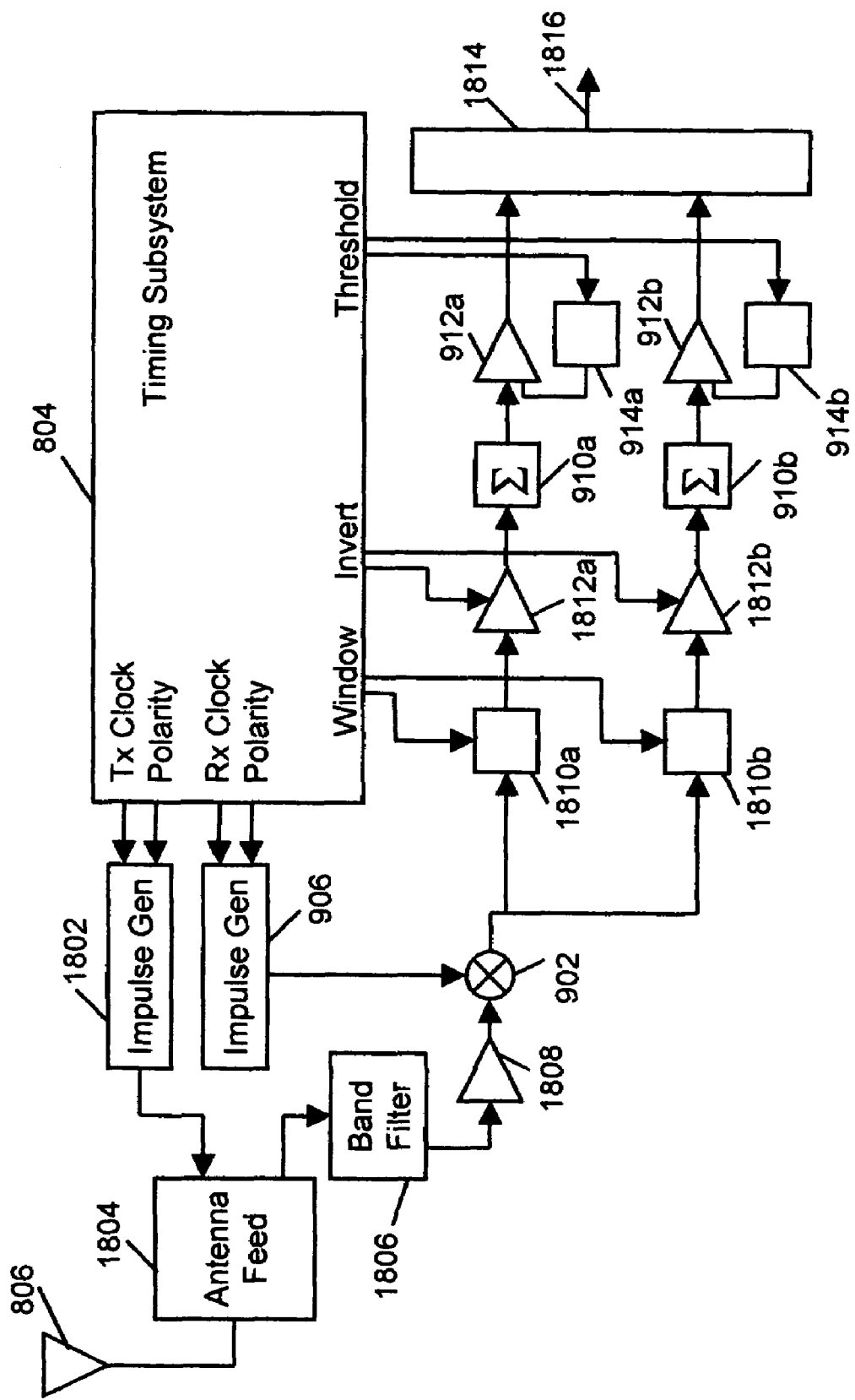
FIG. 18 illustrates a system employing multiple range shells.

FIG. 18 illustrates a system employing multiple range shells 1106. The system of FIG. 18 utilizes the effect of aliased range shells 1106 to intentionally generate response to multiple range shells 1106. The system of FIG. 18 separates the range shell 1106 responses in separate parallel baseband channels by using a coded pulse train. Thus, the system of FIG. 18 may distinguish responses among the multiple range shells 1106 and may establish different threshold levels for each range shell 1106. The system of FIG. 18 results in an efficient hardware implementation because of the use of a common RF front end and a relatively high PRF. (The high PRF reduces peak pulse power for the same average power, thus simplifying transmitter design.)

Referring to FIG. 18, A timing system 804 triggers an impulse generator and commands a polarity according to a code. The impulse generator is coupled to the antenna 806 through an antenna feed 1804 network. A T/R switch 1714 may also be used. The reflection is coupled through the antenna feed 1804 network, a band filter 1806 and a gain stage 1808 to a sampler (or correlator) 902. The output of the sampler 902 is passed to multiple parallel baseband channels. Each base band channel is separately responsive to a single respective range shell 1106. Two base band channels are shown, but any number may be constructed. Each channel may include a window function 1810a-1810b to reduce noise between samples. The output of the window function 1810a-1818b is inverted 1812a-1812b or not according to a shifted copy of the transmit code that is shifted differently for each respective range shell 1106. Multiple code inverted pulses are then summed 910a-910b and the result is compared with a threshold 914a-914b using a threshold comparator 912a-912b. The threshold 914a-914b may be set independently for each range shell 1106. The output of the comparators 912a-912b are processed by a logic unit 1814. In one embodiment, each successive range shell 1106 is triggered in sequence with an optional delay between range shells 1106 before a warhead trigger signal is sent. Other algorithms may be used for combining the range shell 1106 information. In another embodiment, the techniques of FIGS. 12, 13, or 14 are combined with each range shell 1106 channel, for example, by adding a bank of filters and respective comparators after the summation stage.

Figure 19:
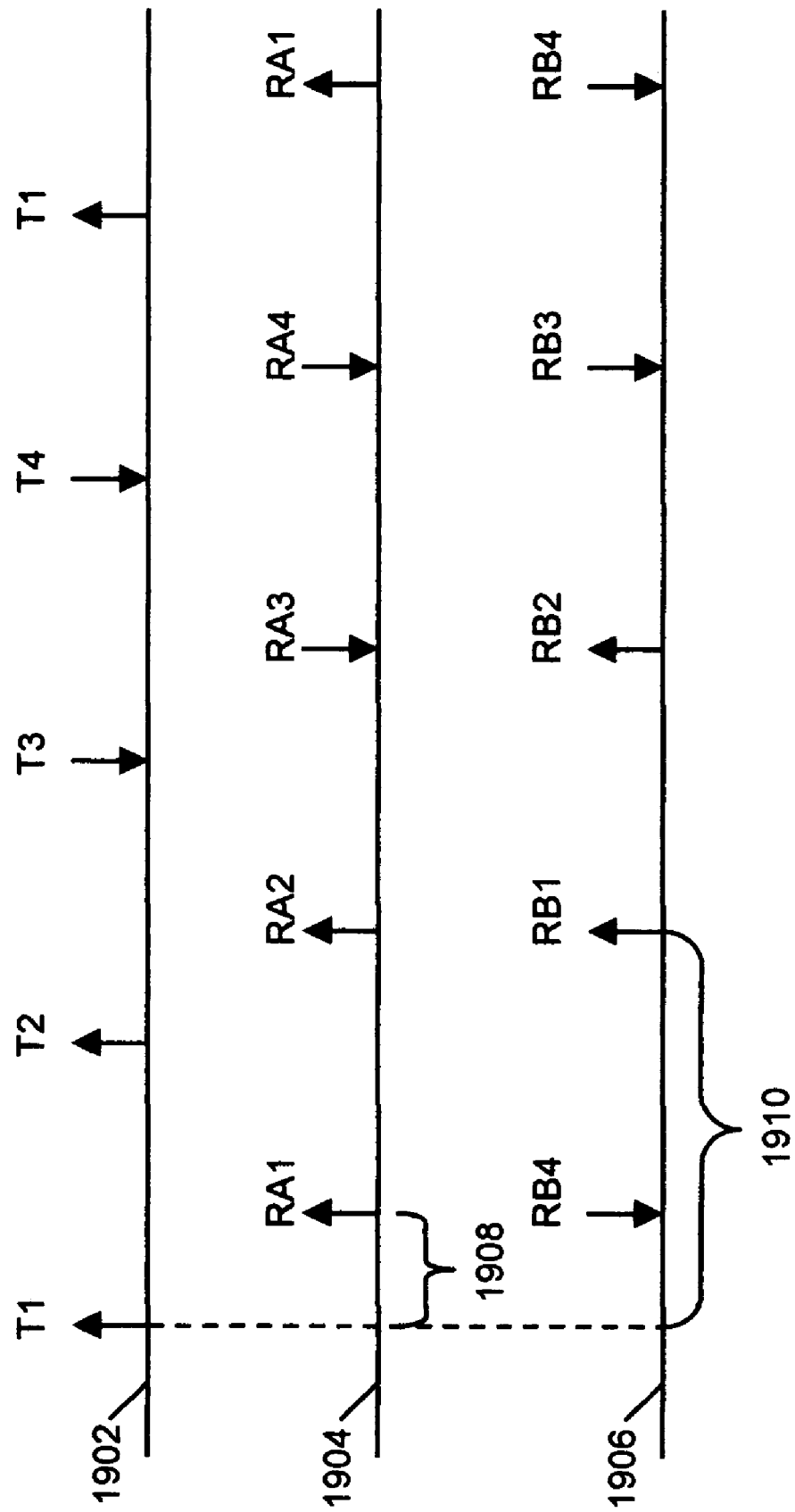
FIG. 19 illustrates an exemplary timing diagram for the system of FIG. 18.

FIG. 19 illustratates an exemplary timing diagram for the system of FIG. 18. Referring to FIG. 19, trace 1902 shows a sequence of coded pulses transmitted by the system of FIG. 18. The arrow direction indicates a relative polarity of each pulse with respect to the underlying phase of the RF waveform. The pulses are coded according to an exemplary code wherein the first two pulses are positive polarity and the next two pulses are negative polarity. The code then repeats. The fifth pulse shown is the first pulse of the repeat cycle of four pulses.

The pulse responses are received by the receiver of FIG. 18 using a template pulse sequence of constant polarity. Trace 1904 represents the inversion 1812a-1812b signal polarity for channel A at the time of sampling. The delay time 1908 of 13 ns from transmit to receive sampling produces a range shell of 2 meters. The reflection from pulse T1 is sampled at RA1 and a positive result is summed. Likewise T2 is sampled at RA2 and appositive result is summed. Inverted pulse T3 is sampled and inverted and a positive result is summed. Likewise for T4 and RA4, a positive result is summed. Thus, the sum for a code span of four pulses is four.

A similar result is obtained for trace 1906. Trace 1906 represents the inversion polarity for channel B at the time of sampling. The delay time 1910 of 26 ns results in a range cell of 4 meters. The inversion pattern in trace 1906 is a shifted copy of the code used for trace 1902. The reflection from pulse T1 is sampled at RB1 and a positive result is summed. Likewise T2 is sampled at RB2 and appositive result is summed. Inverted pulse T3 is sampled at RB3 and inverted and a positive result is summed. Likewise for T4 and RB4, a positive result is summed. Thus the sum for a code span of four pulses is four.

Examining the cross channel responses, it will be seen that a reflection in range shell A produces no response in channel B and a response in range shell B produces no response in channel A. Referring to FIG. 19, a reflection from T1 at delay 1910 in channel A will be received at polarity RA2 and a positive result summed. A reflection from T2 will be received at polarity RA3 and a negative result will be summed, canceling the positive result of T1. Also, a reflection from T3 is received at RA4 for a positive result and a reflection from T4 is received by RA1 for a negative result, canceling the response from T3, resulting in no net summed result in channel A from a response in range shell B.

Similarly for channel B, a reflection from T1 at delay 1908 in channel B will be received at polarity RB4 and a negative result summed. A reflection from T2 will be received at polarity RB1 and a positive result will be summed, canceling the negative result of T1. Also, a reflection from T3 is received at RB2 for a negative result and a reflection from T4 is received by RB3 for a positive result, canceling the response from T3, resulting in no net summed result in channel B from a response in range shell A.

Other codes may be used in place of the code illustrated in FIG. 19. A good code preferably has, but need not have perfect cancellation as shown in FIG. 19. A good code includes codes with good autocorrelation properties, i.e. low autocorrelation sidelobes for shifted copies of the code. Good codes include, for example, Barker codes, maximal length PN sequences, Kasami codes, and Gold codes.

Prime Power Alternatives

The potentially small size and long life requirements present challenging system requirements. Small ordnance are stored in quantity and may need to be stored for 20 years or more without maintenance, such as changing or checking batteries. Further, the resistance to jamming is, in part, due to the RF transmitter power available, generating a need for high transmit power and thereby high prime power. In one exemplary embodiment, the UWB system requires 5 watts for a 30 second flight. Further, existing launch canisters already deployed in the field cannot be modified to supply this power to an energy storage device, such as a capacitor or rechargeable battery. This leaves few alternatives for the prime power source.

Turbines have been used for projectiles wherein air is ducted through the turbine from outside the projectile; however, there is some impact on accuracy and range, especially for a small projectile, and the turbine consumes valuable space because of the large amount of low pressure air that is used by the turbine.

Figure 20:
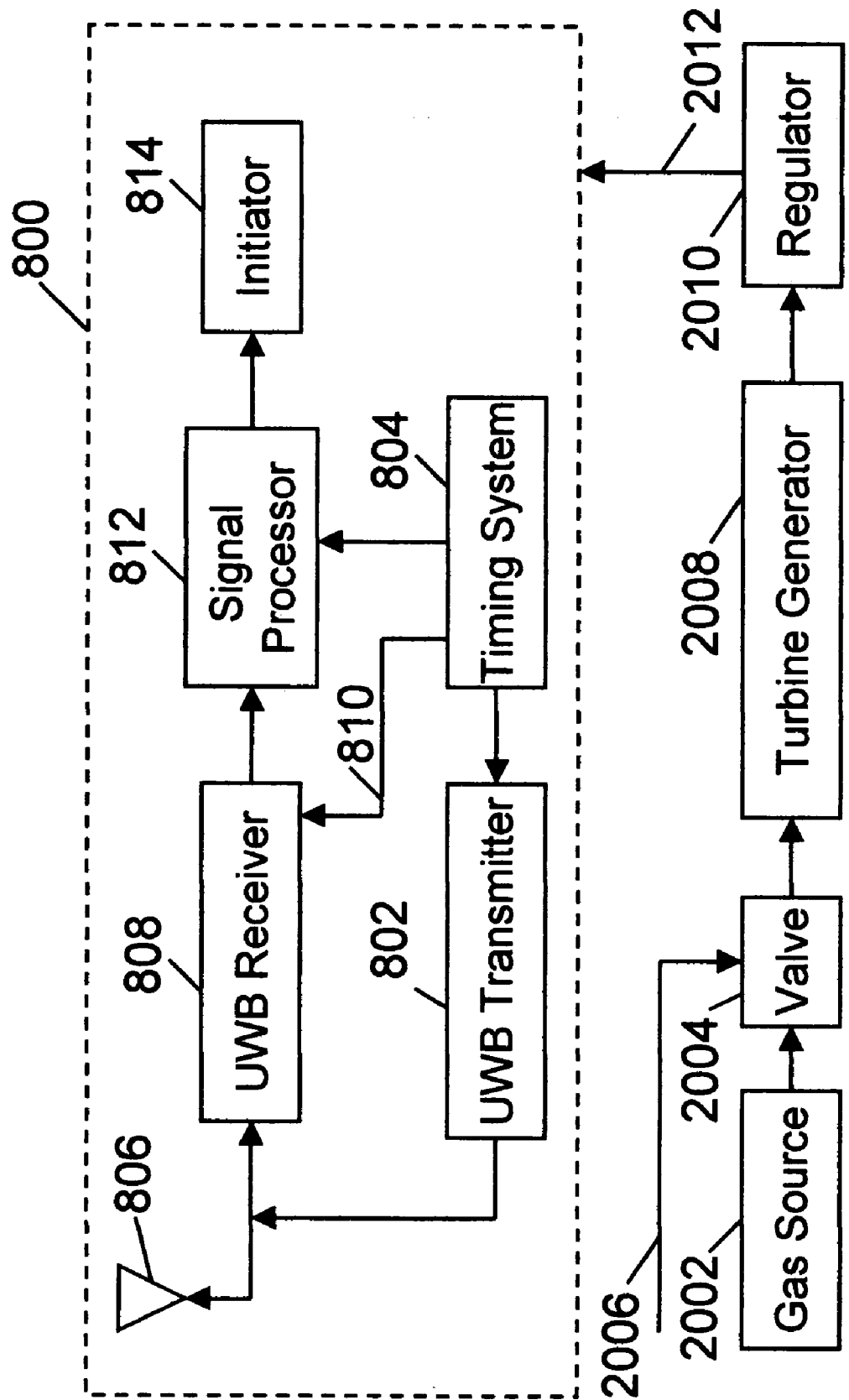
FIG. 20 illustrates a system including an internal turbine in accordance with the present invention.

FIG. 20 illustrates a system including an internal turbine in accordance with the present invention. Referring to FIG. 20, a high pressure gas source 2002 is connected to a turbine 2008 by a valve 2004 that is triggered at the launch of the missile. The gas source 2002 then spins up the turbine 2008 to on the order of, for example, 400,000 rpm, which produces a high frequency (20 kHz) alternating current that is rectified and regulated 2010 to provide power 2012 to the proximity fuze 800.

Compressed gas 2002 is the prime candidate for primary energy because of its high energy density of 50 Joules/CC at 100 atm. pressures. In one embodiment, the compressed gas 2002 may be nitrogen stored in a metal canister. A metal diaphragm 2006 is ruptured on missile launch to start the flow of the gas. In another embodiment, the compressed gas is generated by a pyrotechnic warm gas generator 2002.

In one embodiment, the turbine would comprise a turbine wheel that would measure 9 mm diameter and 1 mm thick, would consume gas at 0.0002 lb/sec at 600 psi, would produce about 5 Watts of power, and would have an overall size including its enclosure and alternator of 10 mm×3 mm.

In one embodiment, a pipe of several cubic centimeters of internal capacity is pressurized to 150 atmospheres with nitrogen gas. The pipe is run around the inner circumference of the nose cone. The airflow past the nose is used to supply heat needed to keep the expanding gas warm to overcome the cooling effect of decreasing pressure with gas use and thus increase the energy available from the stored gas.

Antenna Alternatives

FIGS. 21 through 24 depict three embodiments for the proximity fuze. Small volume for the electronics and integration with a suitable UWB antenna represent the two primary design considerations. UWB antenna design depends upon the mission requirements for fuzing off the vertical targets or the ground. These requirements determine the optimal beam shape and hence the desired antenna to produce that beam shape.

Forward Looking Circular Polarization UWB Fuze

FIG. 21A and FIG. 21B illustrate one embodiment of the UWB proximity fuze employing a crossed planar slot horn antenna. FIG. 21A is a cross section view at the base of the antenna. FIG. 21B is a cross section side view. Referring to FIG. 21A, two tapered slot antennas 2102 and 2104 are positioned at right angles to one another in the center of the nose cone 206. The nose cone 206 is a low loss radome 206 material to allow radiation through the wall. The two antennas 2102 and 2104 are fed at the feed point 2106 with a UWB 90 degree hybrid to produce circular polarization (CP). CP has a further advantage in suppression interference, resulting in a cleaner, and more accurate and precise fuzing signal.

Referring to FIG. 21B, the antenna elements 2102 are shown. The antenna profile 2108 in the horn gap may follow curves known in the art as exponential, Vivaldi, Heden, and others.

Circuit boards for the system may be mechanically integrated with the antenna and may have a tongue and slot design that facilitates easy assembly. The strong design can easily withstand launch acceleration. The circuit boards may have cut outs near the center axis where the Vivaldi slots are located to avoid interfering with the field in the slots. Piezoelectric contact switches (not shown) may be placed around the radome but outside of the influence area for the main beam of the antenna.

Figure 22:
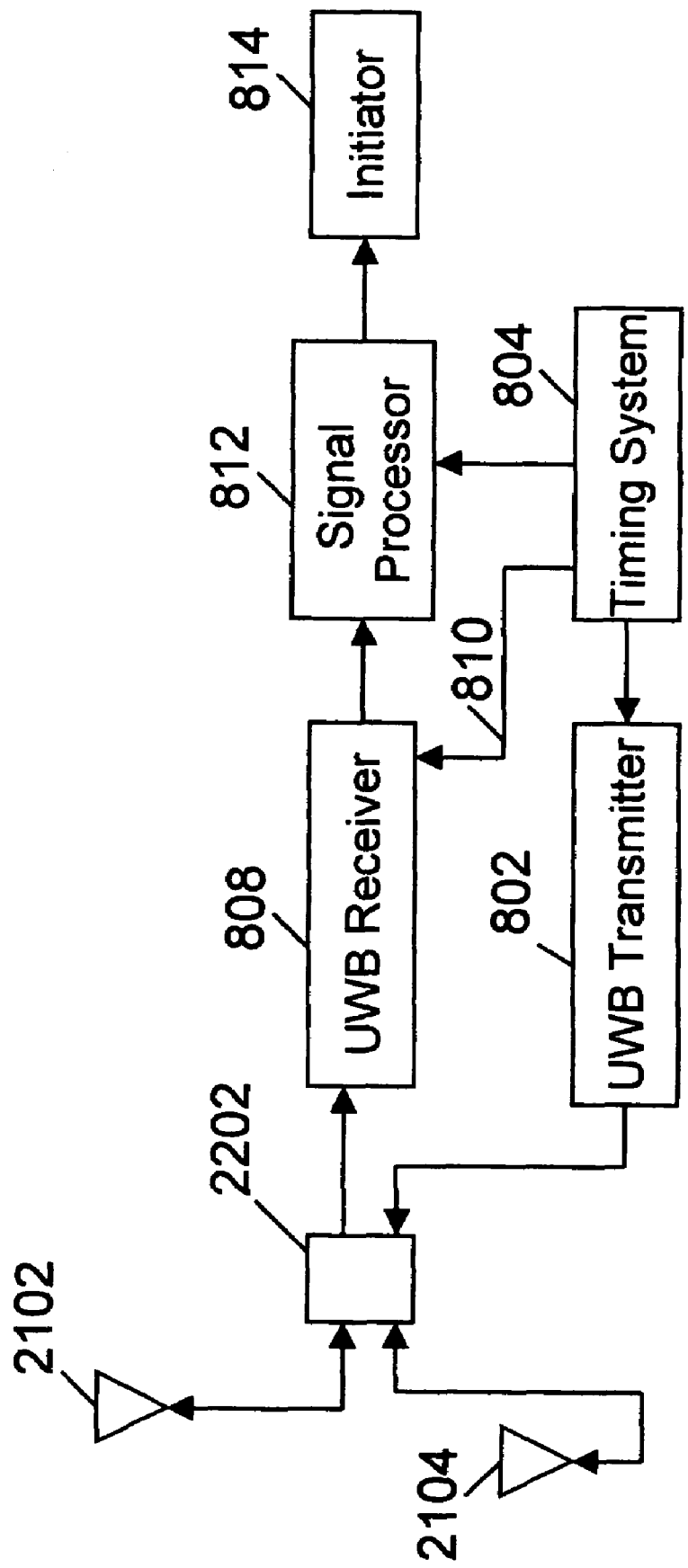
FIG. 22 shows the feed network for the antenna of FIG. 21A and FIG. 21B.

FIG. 22 shows the feed network for the antenna of FIG. 21. Referring to FIG. 22, the UWB transmitter 802 is coupled to the input port of the hybrid coupler 2202. The two antennas 2102 and 2104 are coupled to the zero and 90 degree ports. The UWB receiver 808 is coupled to the isolated port. Thus, the crossed antennas 2102 and 2104 driven in this way produce a UWB circularly polarized pulse output in the forward direction. The UWB receiver 808 is sensitive to CP pulses of opposite polarization (hence the term isolated port). Thus, if the antennas 2102 and 2104 are arranged to produce transmit pulses that are right hand polarized, the UWB receiver 808 will be sensitive to left hand polarized received pulses. Since pulses reflected off of a target typically reverse in polarization, this configuration enhances sensitivity to target reflections and reduces sensitivity to linear polarized interference signals.

Conical Side Looking Linear Polarization UWB Fuze

Figure 23:
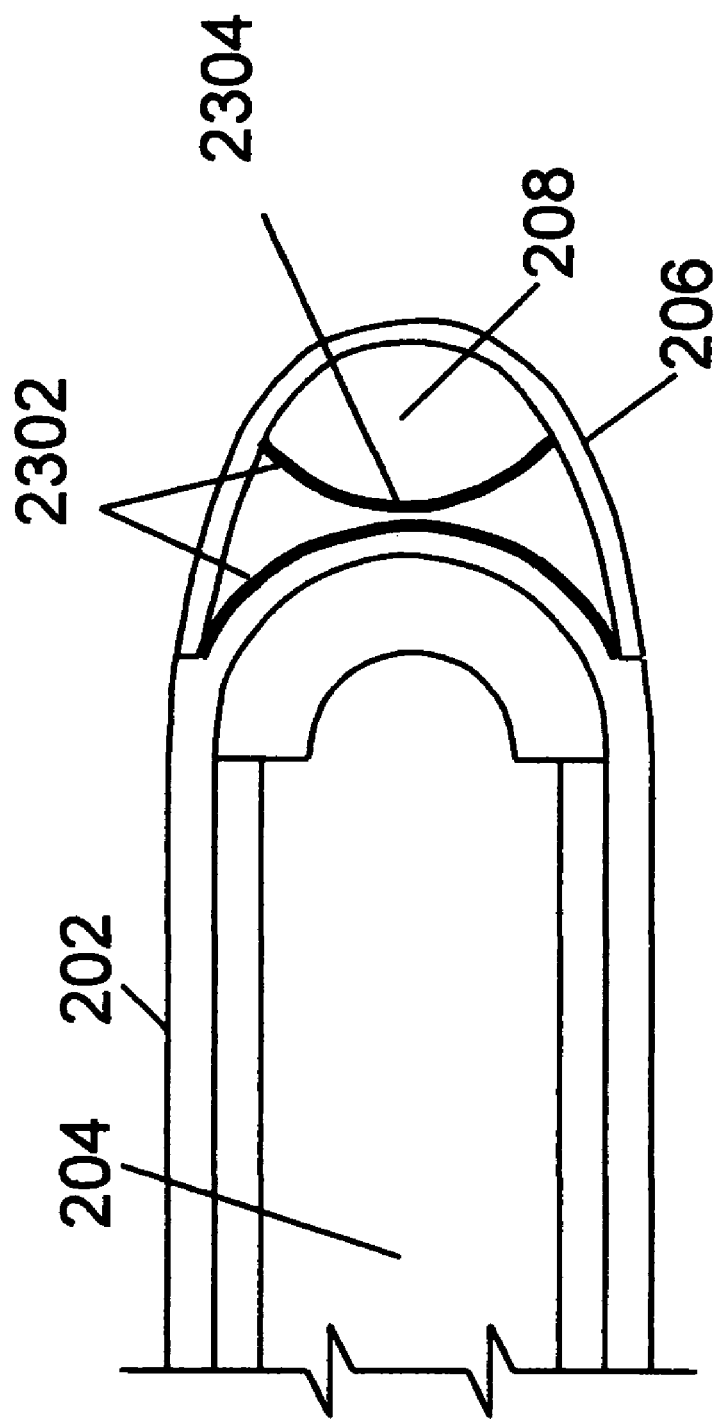
FIG. 23 illustrates an embodiment employing a modified disc cone antenna.

FIG. 23 illustrates an embodiment employing a modified disc cone antenna. Referring to FIG. 23, a modified disc cone antenna 2302 is used to produce an annular conic coverage pattern. This pattern is best for shallow grazing angles and for fuzing off the ground, although the beam will likely be broad enough that forward targets can be fuzed as well. The antenna shown is constructed of partial hemispherical elements fed at the center 2304. The rear element is shown larger than the forward element. The size and shape of the elements may be varied to vary the radiation pattern. The spacing may be varied to control the impedance.

Hemi-Omni Linear Polarization UWB Fuze

Figure 24B:
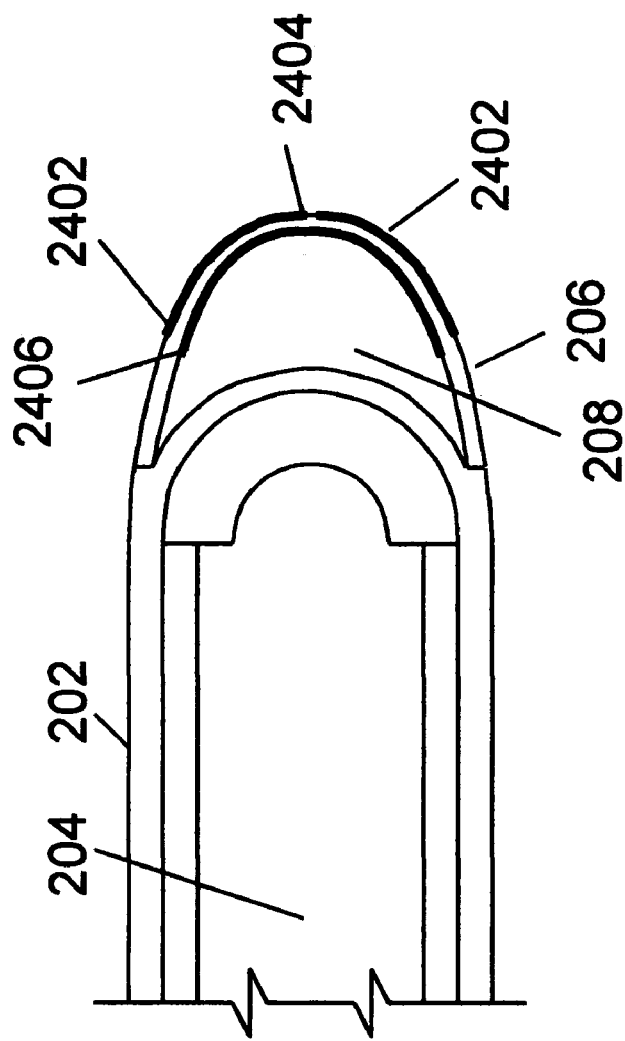
FIG. 24A and FIG. 24B illustrate one embodiment employing a conformal antenna.
Figure 24A:
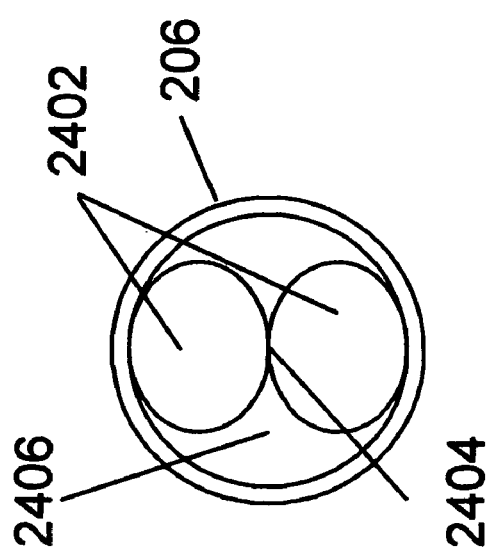

FIG. 24A and FIG. 24B illustrate one embodiment employing a conformal antenna. FIG. 24A is a front view of the nose cone. FIG. 24B is a side sectional view of the projectile. Referring to FIG. 24A and FIG. 24B, the design of FIG. 24 uses an elliptical dipole 2402 conformally placed around the surface of the nose cone with a feed point at the tip 2404. An inner metallic cone 2406 acts like a back reflector for the antenna elements. The antenna 2402 may be constructed in accordance with U.S. patent application Ser. No. 09/670,792, filed Sep. 27, 2000, titled "Electromagnetic Antenna Apparatus", which is incorporated herein by reference. Some adjustment of spacing and shape of the antenna elements 2402 may need to be made depending on the specific shape of the nose cone 206.

Alternatively, for a relatively larger projectile or higher frequency, an array of several (for example three or four) antennas 2402 may be placed around the nose cone 206.

Vector Detection

Figure 25:
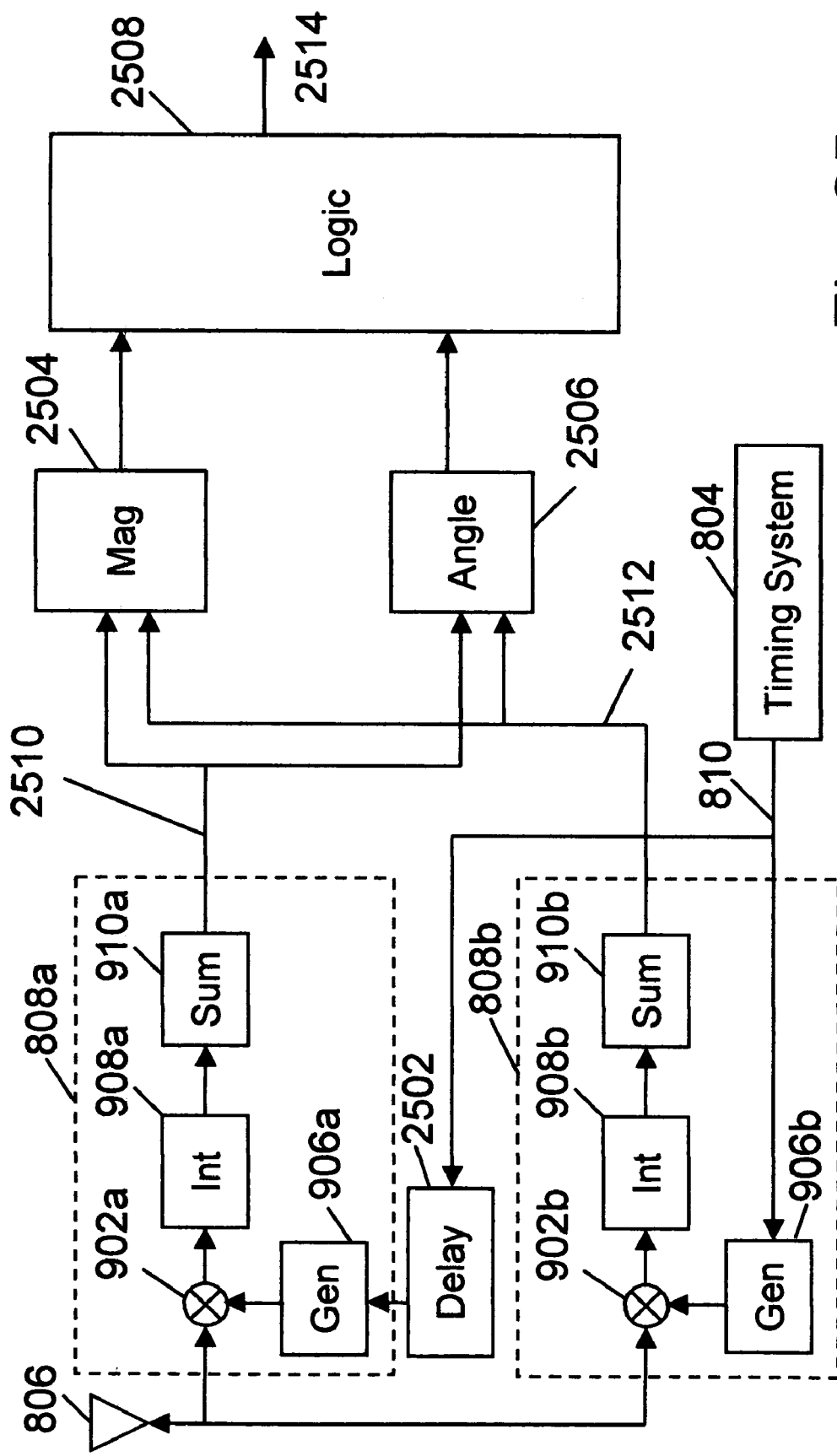
FIG. 25 illustrates a system utilizing vector detection of a target reflection.

FIG. 25 illustrates a system utilizing vector detection of a target reflection. Referring to FIG. 25, FIG. 25 illustrates two correlator sections 808a, 808b of the UWB receiver 808 for receiving the reflection signal. The receive timing signal 810 to correlator 808a is delayed in delay block 2502 by a time interval equal to ¼ cycle at the UWB center frequency; whereas, the receive timing signal 810 to correlator 808b is not delayed. Thus, the outputs 2510, 2512 of the two sampling blocks 808a and 808b form orthogonal samples of the received signal. The two outputs 2510, 2512 define a vector. The magnitude of the vector is determined in block 2504. The magnitude may be the square root of the sum of the squares of the two values 2510, 2512, or may be approximated by the sum of the absolute values. The angle is computed in block 2506 using an arctangent or equivalent algorithm. The magnitude and angle information is processed by a logic block 2508 to derive the trigger signal 2514. In one embodiment, the trigger signal 2514 is issued when the magnitude exceeds a threshold followed by the angle passing through a specified angle in a specified direction. For example, the angle may be zero degrees and the direction may be the direction indicative of approaching the target. The vector detection system of FIG. 25 allows precision triggering on a particular reflected signal phase.

In further embodiments, the filtering and correlation functions of FIGS. 12-14 may be included in the processing of FIG. 25 after the summation 910a, 910b.

CONCLUSION

While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements which embody the spirit and scope of the present invention.

What is claimed is:

1. A proximity fuze for triggering a warhead comprising:
   a UWB radar transmitter for transmitting a UWB radar signal;
   a UWB radar receiver for receiving a return signal;
   an antenna coupled to said UWB radar transmitter and said UWB radar receiver;
   a timing system coupled to said UWB radar transmitter and said UWB radar receiver, wherein said timing system provides timing signals to said transmitter and said receiver;
   a signal processor coupled to said UWB radar receiver; and
   a logic unit coupled to said signal processor for generating a trigger signal to trigger said warhead, wherein said trigger signal is responsive to a target in accordance with at least one aliased range shell.

2. The proximity fuze of claim 1, further including a summing process to sum receiver output signals, said summing process generating a sum signal.

3. The proximity fuze of claim 2, further including a modulation source for modulating said UWB radar signal; wherein said modulation reduces the response of said sum signal to said target in said at least one aliased range shell.

* * * * *